(12) United States Patent
Hu et al.

(10) Patent No.: US 7,496,240 B2
(45) Date of Patent: Feb. 24, 2009

(54) IMAGE DENOISING APPARATUS AND METHOD

(75) Inventors: Jianbo Hu, Changsha (CN); Hongbao Wang, Beijing (CN)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 515 days.

(21) Appl. No.: 11/209,773

(22) Filed: Aug. 24, 2005

(65) Prior Publication Data

US 2007/0047021 A1 Mar. 1, 2007

(51) Int. Cl.
*G06K 9/40* (2006.01)

(52) U.S. Cl. ...................................... 382/275

(58) Field of Classification Search ................ 382/275; 358/463
See application file for complete search history.

(56) References Cited

U.S. PATENT DOCUMENTS

| | | | | |
|---|---|---|---|---|
| 6,108,453 | A * | 8/2000 | Acharya | 382/254 |
| 6,664,973 | B1 * | 12/2003 | Iwamoto et al. | 345/589 |
| 6,879,735 | B1 * | 4/2005 | Portniaguine et al. | 382/275 |
| 7,177,481 | B2 * | 2/2007 | Kaji | 382/265 |
| 7,248,745 | B1 * | 7/2007 | Georgiev et al. | 382/254 |
| 2002/0076118 | A1 * | 6/2002 | Kaji | 382/263 |

OTHER PUBLICATIONS

Gonzalez, Digital Image Processing, Nov. 2001, Prentice Hall, 2, p. 239.*
Hu et al., Adaptive Total Variation Based on Feature Scale, Signal Processing, ICSP 2004, Dec. 17-19, 2004, pp. 245-248.
Rudin et al., Nonlinear Total Variation Based Noise Removal Algorithms, Physica D 60, 259-268, (1992).

* cited by examiner

*Primary Examiner*—Jingge Wu
*Assistant Examiner*—Max Shikhman
(74) *Attorney, Agent, or Firm*—Banner & Witcoff, Ltd.

(57) ABSTRACT

According to an image de-noising method, an original image is corrected into an intermediate correction image. A differential image is determined between the original image and the intermediate correction image. Each pixel in the differential image has a differential pixel value equal to a difference between the pixel value of the corresponding pixel in the original image and the corrected pixel value of the corresponding pixel in the intermediate correction image. A pixel-dependent conversion parameter is determined at each pixel based on the differential pixel value at the each pixel in the differential image. The original image is corrected into a final correction image by using the pixel-dependent conversion parameter.

17 Claims, 9 Drawing Sheets

IMAGE DENOISING APPARATUS AND METHOD

BACKGROUND OF THE INVENTION

1. Field of the Invention

The present invention relates to an image de-noising method and apparatus for removing noise from images.

2. Description of Related Art

A total variation method for removing noise from images has been proposed by Leoinid I. Rudin, et al. in "Nonlinear total variation based noise removal algorithms" (Physica D 60 (1992) pp. 259-268).

However, small details and textures are often lost in the process of the conventional total variation method because the conversion or regularization parameter is fixed over the entire image.

SUMMARY OF THE INVENTION

In view of the above-described drawbacks, it is an objective of the present invention to provide an improved image de-noising method and apparatus that can remove noise while preserving small details and textures.

In order to attain the above and other objects, the present invention provides an image de-noising method, including: correcting an original image into an intermediate correction image; determining a differential image between the original image and the intermediate correction image; and determining a pixel-dependent conversion parameter and correcting the original image into a final correction image by using the pixel-dependent conversion parameter. The original image has a plurality of pixels that are arranged two-dimensionally, each pixel in the original image having a pixel value. The intermediate correction image has a plurality of pixels that are arranged two-dimensionally with a one-to-one correspondence with the plurality of pixels of the original image, each pixel in the intermediate correction image having a corrected pixel value. The differential image has a plurality of pixels that are arranged two-dimensionally with a one-to-one correspondence with the plurality of pixels of the original image. The differential image has, for each pixel, a differential pixel value equal to a difference between the pixel value of the corresponding pixel in the original image and the corrected pixel value of the corresponding pixel in the intermediate correction image. The pixel-dependent conversion parameter is determined at each pixel based on the differential pixel value at the each pixel in the differential image. The final correction image has a plurality of pixels that are arranged two-dimensionally with a one-to-one correspondence with the plurality of pixels of the original image.

According to another aspect, the present invention provides an image de-noising apparatus, including: a correcting unit; a determining unit; and a determining-and-correcting unit. The correcting unit corrects an original image into an intermediate correction image, the original image having a plurality of pixels that are arranged two-dimensionally, each pixel in the original image having a pixel value, the intermediate correction image having a plurality of pixels that are arranged two-dimensionally with a one-to-one correspondence with the plurality of pixels of the original image, each pixel in the intermediate correction image having a corrected pixel value. The determining unit determines a differential image between the original image and the intermediate correction image, the differential image having a plurality of pixels that are arranged two-dimensionally with a one-to-one correspondence with the plurality of pixels of the original image, the differential image having, for each pixel, a differential pixel value equal to a difference between the pixel value of the corresponding pixel in the original image and the corrected pixel value of the corresponding pixel in the intermediate correction image. The determining-and-correcting unit determines a pixel-dependent conversion parameter at each pixel based on the differential pixel value at the each pixel in the differential image and that corrects the original image into a final correction image by using the pixel-dependent conversion parameter, the final correction image having a plurality of pixels that are arranged two-dimensionally with a one-to-one correspondence with the plurality of pixels of the original image.

According to another aspect, the present invention provides a data storage medium storing an image de-noising program readable by a computer. The image de-noising program includes: a program of correcting an original image into an intermediate correction image; a program of determining a differential image between the original image and the intermediate correction image; and a program of determining a pixel-dependent conversion parameter and correcting the original image into a final correction image by using the pixel-dependent conversion parameter. The original image has a plurality of pixels that are arranged two-dimensionally, each pixel in the original image having a pixel value. The intermediate correction image has a plurality of pixels that are arranged two-dimensionally with a one-to-one correspondence with the plurality of pixels of the original image, each pixel in the intermediate correction image having a corrected pixel value. The differential image has a plurality of pixels that are arranged two-dimensionally with a one-to-one correspondence with the plurality of pixels of the original image, the differential image having, for each pixel, a differential pixel value equal to a difference between the pixel value of the corresponding pixel in the original image and the corrected pixel value of the corresponding pixel in the intermediate correction image. The pixel-dependent conversion parameter is determined at each pixel based on the differential pixel value at the each pixel in the differential image. The final correction image has a plurality of pixels that are arranged two-dimensionally with a one-to-one correspondence with the plurality of pixels of the original image.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

Figure 1:
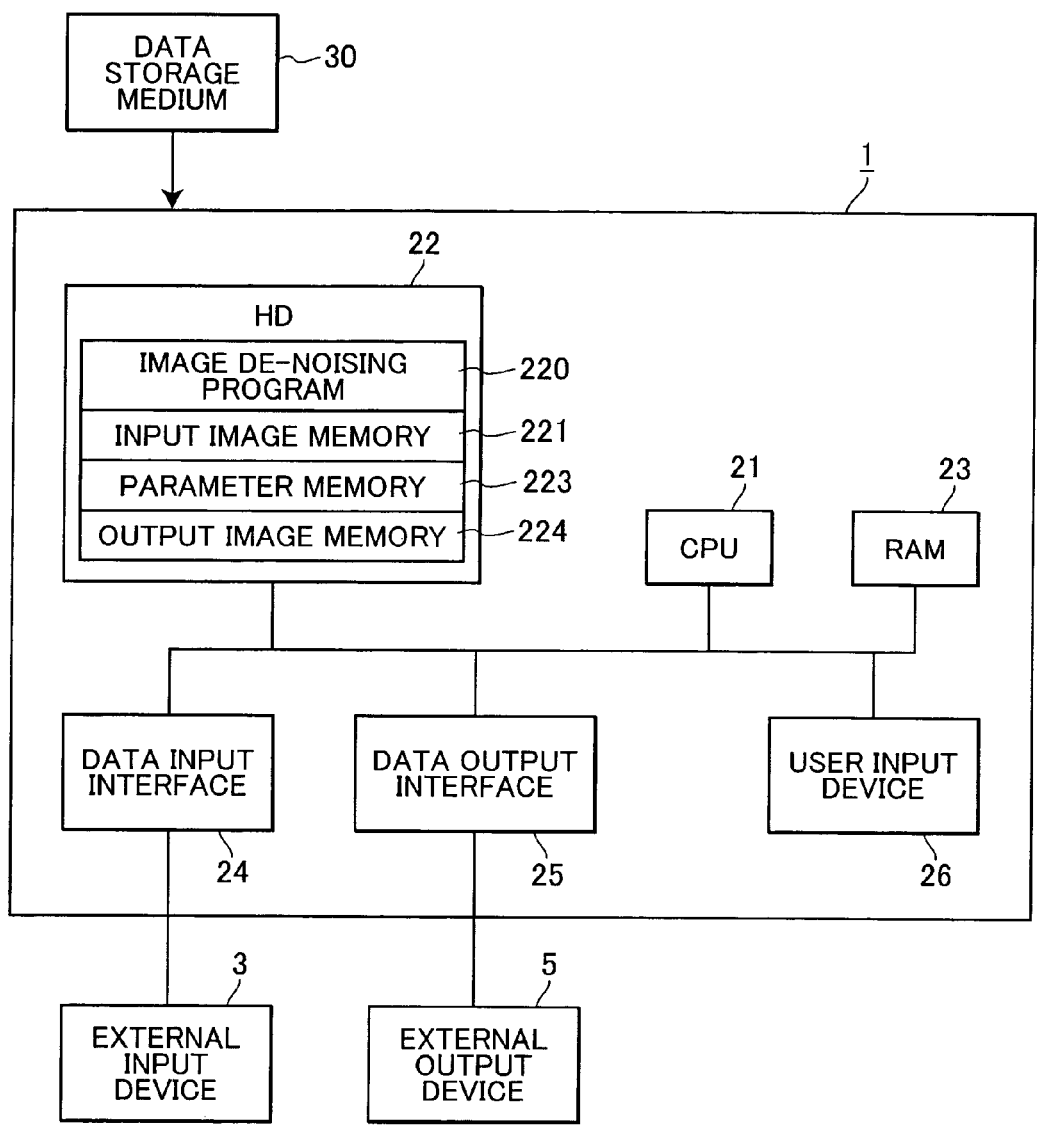
FIG. 1 is a block diagram showing an image de-noising apparatus according to a preferred embodiment of the present invention.

An image de-noising apparatus according to a preferred embodiment of the present invention will be described while referring to the accompanying drawings wherein like parts and components are designated by the same reference numerals to avoid duplicating description.

<Configuration of the Image De-Noising Apparatus>

FIG. 1 shows an image de-noising apparatus 1 according to the embodiment that is configured of a personal computer (PC). The image de-noising apparatus 1 includes a CPU 21, a hard disk 22, a RAM 23, a data input interface 24, a data output interface 25, and a user input device 26.

Various programs, including an image de-noising program 220 according to the present embodiment, are stored on the hard disk 22 in advance. The image de-noising program 220 will be described later with reference to FIGS. 2-8.

The CPU 21 controls the entire image de-noising apparatus 1 by executing the programs stored on the hard disk 22. The CPU 21 performs an image de-noising process by executing the image de-noising program 220.

The RAM 23 is for storing various data calculated during the image de-noising process.

The hard disk 22 further includes an input image memory 221, a parameter memory 223, and an output image memory 224.

The input image memory 221 serves to store an original image I that will be processed according to the image de-noising program 220.

The parameter memory 223 is provided for storing various parameters used during the image de-noising process. These parameters include: a pixel-independent conversion or regularization parameter $\alpha$, pixel-dependent conversion or regularization parameters $\alpha(i, j)$, a correction adjustment coefficient k, a parameter adjustment coefficient k', a repetition number R, a threshold th, and a hypothetical noise energy E for all pixels.

The output image memory 224 serves to store an output image O that is obtained through the image de-noising process based on the original image I.

The data input interface 24 includes an input port for receiving data of the original image I from an external input device 3, such as a digital camera, a scanner, or the like. The data input interface 24 may receive data of the original image I via a network, such as the Internet.

The data output interface 25 functions to output data of the output image O to an external output device 5, such as a display monitor, a printer, or the like. The data output interface 25 may output data of the output image O via a network, such as the Internet.

The user input device 26 includes a keyboard and a mouse (not shown) through which a user can input settings for the parameters described above.

It should be noted that the image de-noising program 220 may be originally stored on a data storage medium 30, such as a flexible disk, a CD-ROM, a DVD-ROM, and the like, and may be subsequently loaded from this storage medium 30 onto the hard disk 22 through a corresponding data reading device (not shown) that is mounted in the image de-noising apparatus 1. Alternatively, the image de-noising program 220 may be downloaded from a network, such as the Internet, to the image de-noising apparatus 1 and stored on the hard disk 22.

In this example, the external output device 5 is a printer, and the de-noising program is included in a printer driver program executed by the CPU 21.

Often images (the original image I) that a user acquires with an external input device 3, such as a digital camera, contain undesirable noise. When the user wishes to remove this noise from the original image I before outputting (printing in the present example) the original image I to the external output device 5, the user operates the user input device 26 to start the image de-noising process.

After the original image I is corrected through the image de-noising process, producing the output image O, the user manipulates the user input device 26 to input a print command to the printer driver program. As a result, the output image O is subjected to a predetermined color conversion process and a predetermined halftone process such as an error-diffusion or a dither process, before being outputted to the printer 5.

<Image>

Figure 2:
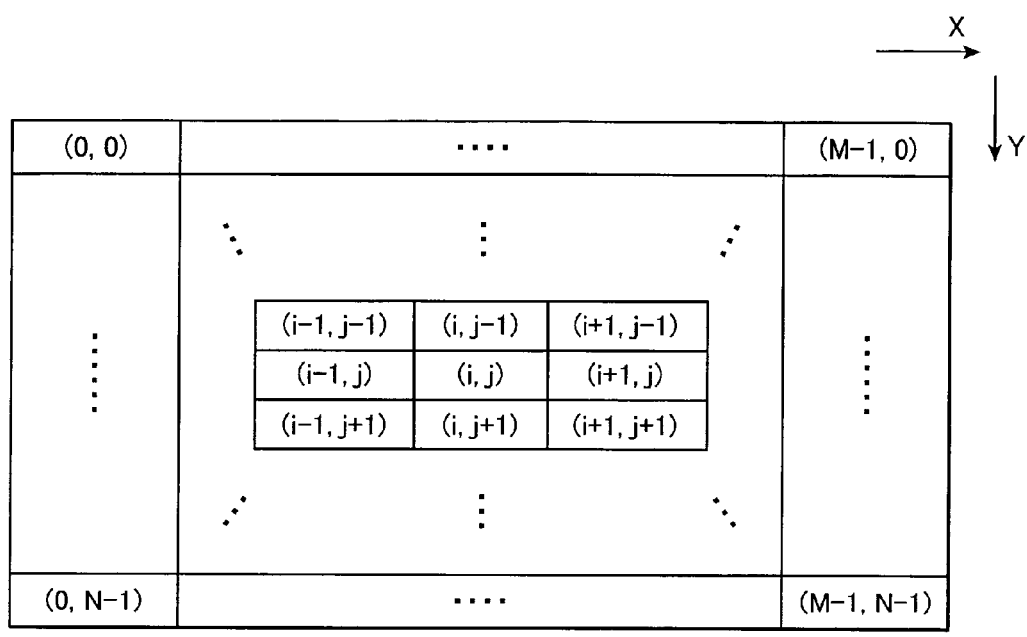
FIG. 2 is an explanatory diagram showing how pixels are arranged two-dimensionally in an image.

The original image I has a plurality of picture elements (pixels), which are arranged two-dimensionally. In this example, as shown in FIG. 2, the original image I has a total of M×N pixels, where M and N are integers greater than one. The pixels are arranged in N rows by M columns. The M number of columns are arranged in a main scanning direction X. Each column extends in a sub-scanning direction Y substantially orthogonal to the main scanning direction X. The N number of rows are arranged in the sub-scanning direction Y. Each row extends in the main scanning direction X.

Each pixel position is denoted by (i, j), where i and j are integers and satisfy the following inequalities: $0 \leq i \leq (M-1)$, and $0 \leq j \leq (N-1)$. Data of the original image I has a pixel value I(i, j) for each pixel (i, j). In this example, the pixel value I(i, j) is an eight-bit value and, therefore, is in a range from 0 to 255.

It should be noted that the output image O obtained through the image de-noising process has M×N pixels having a one-to-one correspondence with the M×N pixels in the original image I. Data of the output image O includes a pixel value O(i, j) for each pixel (i, j). In this example, the pixel value O(i, j) is also an eight-bit value and is in a range from 0 to 255.

It should also be noted that during the image de-noising process, various images are created based on the original image. Each image has M×N pixels having a one-to-one correspondence with the M×N pixels in the original image I. Data of each image includes a pixel value for each pixel (i, j). In this example, the pixel value in each image is also an eight-bit value and is in a range from 0 to 255.

According to the present embodiment, a variation characteristics value "Num(i, j)/Den(i, j)" is defined for an arbitrary image at each pixel location (i, j) to indicate how pixel values at pixels surrounding each pixel location (i, j) vary relative to the pixel value at the target pixel location (i, j) in the arbitrary image. The variation characteristics value "Num(i, j)/Den(i, j)" is defined by a pair of gradation/smoothness characteristics values "Num(i, j)" and "Den(i, j)" for each pixel location (i, j). These gradation/smoothness characteristics indicate the degree of gradation and smoothness around the target pixel location (i, j).

Here, it will be assumed that the arbitrary image has a pixel value Q(i, j) at each pixel position (i, j). The gradation/ smoothness characteristics Num(i, j) and Den(i, j) are defined for each pixel (i, j) in the arbitrary image according to the following formulas (1):

$$Num(i,j) = pXX \times (1+pY^2) - 2 \times (pX \cdot pY \cdot pXY) + pYY \times (1+pX^2),$$

$$Den(i,j) = (1 + pX \cdot pY + pY \cdot pY)^{1.5} \qquad (1)$$

where:
pX=[Q(i+1, j)−Q(i−1, j)]/2,
pXX=[Q(i+1, j)+Q(i−1, j)]−2×Q(i, j),
pY=[Q(i, j−1)−Q(i, j+1)]/2,
pYY=[Q(i, j−1)+Q(i, j+1)]−2×Q(i, j),
pXY={[Q(i−1, j−1)+Q(i+1, j+1)]−[Q(i+1, j−1)+Q(i−1, j+1)]}/4.

The value pX indicates the gradation around the target pixel (i, j) in the main scanning direction X; the value pXX indicates the smoothness around the target pixel (i, j) in the main scanning direction X; the value pY indicates the gradation around the target pixel (i, j) in the sub-scanning direction Y; the value pYY indicates the smoothness around the target pixel (i, j) in the sub-scanning direction Y; and the value pXY indicates the gradation in diagonal directions.

The variation characteristics value "Num(i, j)/Den(i, j)" at a pixel location (i, j) indicates how pixel values Q(i−1, j−1), Q(i, j−1), Q(i+1, j−1), Q(i−1, j), Q(i+1, j), Q(i−1, j+1), Q(i, j+1), and Q(i+1, j+1) at eight pixel locations (i−1, j−1), (i, j−1), (i+1, j−1), (i−1, j), (i+1, j), (i−1, j+1), (i, j+1), and (i+1, j+1) surrounding the target pixel (i, j) vary relative to the pixel value Q(i, j) at the target pixel (i, j).

<Outline of the Image De-Noising Process>

Next will be described, with reference to FIG. 3, an outline of the image de-noising process of the present embodiment.

Figure 3:
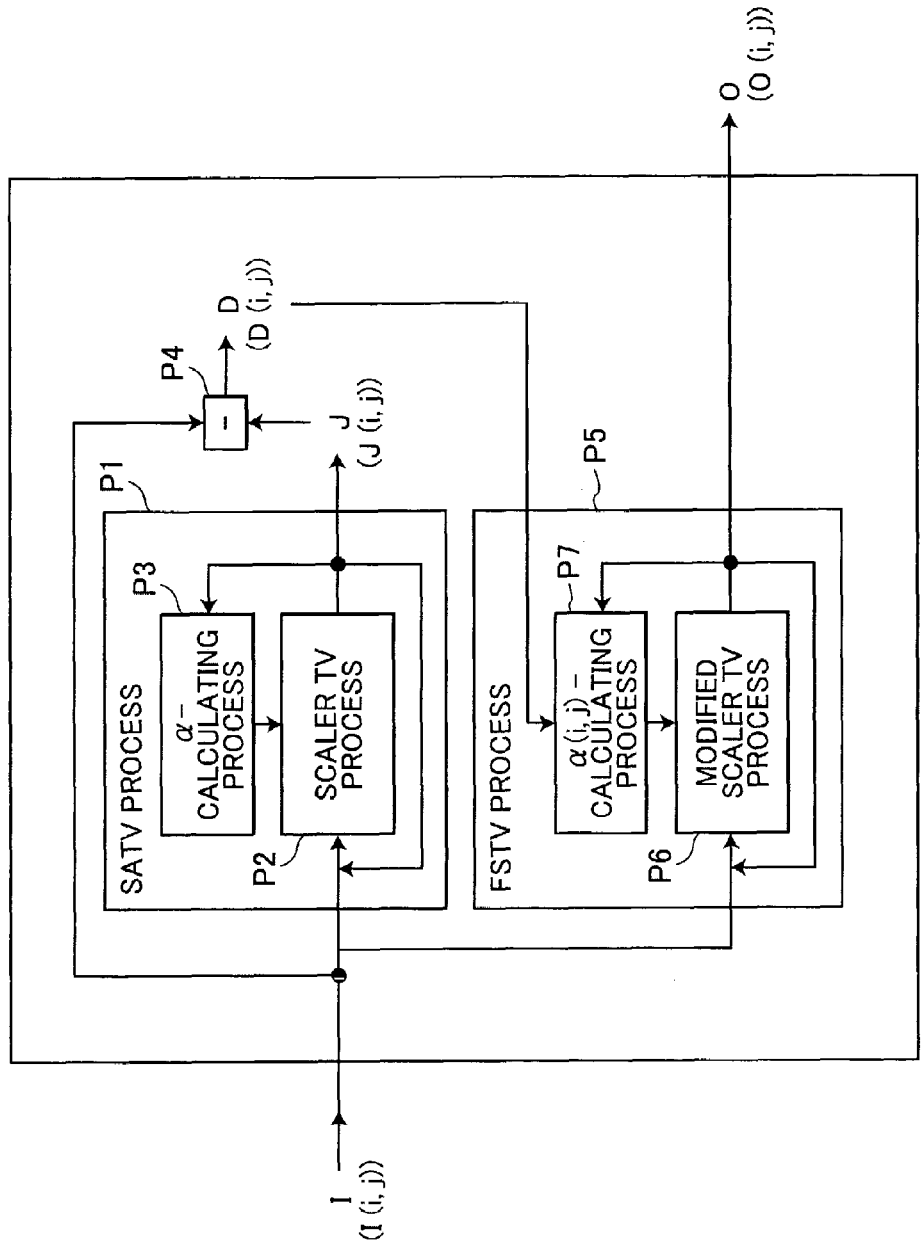
FIG. 3 is a function diagram showing an image de-noising process executed by the image de-noising apparatus of FIG. 1.

As shown in FIG. 3, when the image de-noising process starts, the pixel values I(i, j) for all M×N pixels in the original image I are first subjected to a scale driven adaptive total variation (SATV) process P1.

Through the SATV process P1, the original image I is corrected to produce a provisional correction image J. In other words, the pixel values I(i, j) in the original image I are converted to pixel values J(i, j) constituting the provisional correction image J.

During the SATV process P1, a scaler total variation (scaler TV) process P2 and an α-calculating process P3 are executed. During the scaler TV process P2, the pixel values I(i, j) for the original image I are corrected using the pixel-independent conversion parameter α, which is calculated through the α-calculating process P3. During the α-calculating process P3, the pixel-independent parameter α is calculated based on the pixel values produced by correcting the pixel values I(i, j) in the scaler TV process P2. The scaler TV process P2 and the α-calculating process P3 are executed repeatedly as an iterative loop until it is determined that the scaler TV process P2 has produced sufficient provisional-correction-image pixel values J(i, j) from the original-image pixel values I(i, j).

Next, a differential-image creating process P4 is executed to produce a differential image D having pixel values D(i, j) equivalent to differences between the original-image pixel values I(i, j) and the provisional-correction-image pixel values J(i, j). The differential-image pixel values D(i, j) therefore satisfy the following equation (2):

$$D(i,j) = |I(i,j) - J(i,j)| \qquad (2)$$

Next, the original-image pixel values I(i, j) for all M×N pixels are subjected to a feature scale total variation (FSTV) process P5. Through the FSTV process P5, the original-image pixel values I(i, j) are corrected, producing output-image pixel values O(i, j) for the output image O.

During the FSTV process P5, a modified scaler total variation (modified scaler TV) process P6 and an α (i, j)-calculating process P7 are executed. During the modified scaler TV process P6, the original-image pixel values I(i, j) are corrected using the pixel-dependent conversion parameters α (i, j), which are calculated through the α (i, j)-calculating process P7. During the α (i, j)-calculating process P7, the pixel-dependent parameters α (i, j) for all pixel locations (i, j) are calculated based on the differential-image pixel densities D(i, j) and on the pixel values produced by correcting the original-image pixel values I(i, j) in the modified scaler TV process P6. The modified scaler TV process P6 and the α (i, j)-calculating process P7 are executed repeatedly as another iterative loop until it is determined that the modified scaler TV process P6 has produced sufficient output-image pixel values O(i, j) from the original-image pixel values I(i, j).

<Main Flowchart>

Next, the image de-noising process will be described in greater detail with reference to the flowcharts of FIGS. 4-8.

When the image de-noising process starts, in S10, the CPU 21 first receives the original-image pixel values I(i, j) for all M×N pixels from the external input device 3 via the data input interface 24. The CPU 21 stores data of the original-image pixel values I(i, j) in the input image memory 221.

Also in S10, the CPU 21 initializes the parameters. More specifically, the CPU 21 sets: a default value (0.2, for example) for the correction adjustment coefficient k; a default value (0.2, for example) for the parameter adjustment coefficients k'; a default value (10, for example) for the repetition number R; a default value (0.0001, for example) for the threshold th; and a default value (8×M×N, for example) for the hypothetical noise energy E for all pixels.

It should be noted that the user can manipulate the user input device 26 in S10 to set desired values for the correction adjustment coefficient k, parameter adjustment coefficient k', the repetition number R, the threshold th, and the hypothetical noise energy E for all pixels.

Next, in S20, the CPU 21 executes the SATV process to correct the original-image pixel values I(i, j), resulting in the provisional-correction-image pixel values J(i, j).

Next, in S30, the CPU 21 determines differential-image pixel values D(i, j) based on the original-image pixel values I(i, j) and the provisional-correction-image pixel values J(i, j) by calculating the above-described formula (2).

Next, in S40, the CPU 21 executes the FSTV process to correct the original-image pixel values I(i, j), resulting in the output-image pixel values O(i, j).

Next, in S50, the CPU 21 stores data of the output-image pixel values O(i, j) in the output image memory 224.

Here, the image de-noising process ends.

The output-image pixel values O(i, j) will be outputted via the data output interface 25 to the external output device 5 after being subjected to the necessary image processes.

<SATV>

Figure 5:
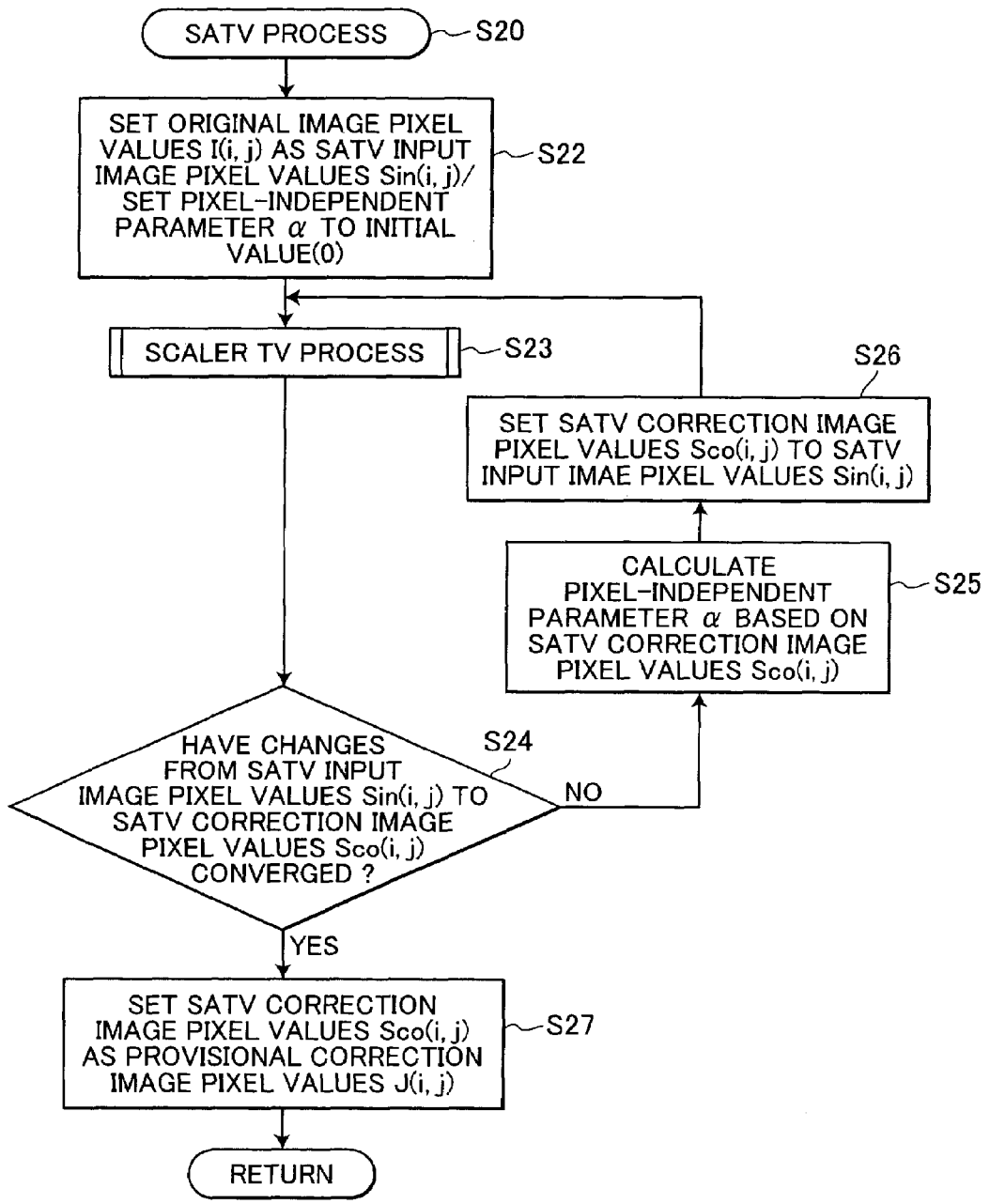
FIG. 5 is a flowchart of an SATV process in the image de-noising process of FIG. 4.

Next, the SATV process of S20 will be described with reference to FIG. 5.

First, in S22, the CPU 21 sets the original image I as a SATV input image Sin to be subjected to the SATV process. In other words, the CPU 21 sets the original-image pixel values I(i, j) as SATV-input-image pixel values Sin(i, j) to be subjected to the SATV process. Also in 322, the CPU 21 initializes the pixel-independent conversion parameter α to zero (0).

Next, in S23, the CPU 21 executes the scaler TV process on the SATV input image Sin to correct the SATV input image Sin, producing a SATV correction image Sco. That is, the CPU 21 executes the scaler TV process to convert the SATV-input-image pixel values Sin(i, j) into SATV-correction-image pixel values Sco(i, j).

Next, in S24, the CPU 21 compares all the SATV-input-image pixel values Sin(i, j) to the corresponding SATV-correction-image pixel values Sco(i, j) and determines whether the total change is small enough that the SATV-input-image pixel values Sin(i, j) and the SATV-correction-image pixel values Sco(i, j) have sufficiently converged.

More specifically, in S24, the CPU 21 calculates a difference-square-sum $DSS_{SATV}$ between the SATV-input-image pixel values Sin(i, j) and the SATV-correction-image pixel values Sco(i, j). The difference-square-sum $DSS_{SATV}$ is defined as the sum of the differences between the SATV-input-image pixel values Sin(i, j) and the SATV-correction-image pixel values Sco(i, j) squared for all N×M pixels.

That is, the CPU 21 calculates the following formula (3):

$$DSS_{SATV} = \Sigma_{i,j}(|Sin(i,j) - Sco(i,j)|^2) \quad (3)$$

where "$\Sigma_{i,j}()$" is an operator for summing up the value in the parenthesis for all M×N pixels.

The CPU 21 then compares the difference-square-sum $DSS_{SATV}$ with the threshold th. When the difference-square-sum $DSS_{SATV}$ is greater than the threshold th, the CPU 21 determines that the changes from the SATV-input-image pixel values Sin(i, j) to the SATV-correction-image pixel values Sco(i, j) have not yet converged. However, when the difference-square-sum $DSS_{SATV}$ is smaller than or equal to the threshold th, the CPU 21 determines that the changes from the SATV-input-image pixel values Sin(i, j) to the SATV-correction-image pixel values Sco(i, j) have sufficiently converged.

When the changes from the SATV-input-image pixel values Sin(i, j) to the SATV-correction-image pixel values Sco(i, j) have not yet converged (no in S24), the process proceeds to S25.

In S25, the CPU 21 calculates the pixel-independent conversion parameter α for the SATV-correction-image pixel values Sco (i, j).

More specifically, in S25, the CPU 21 first determines a pair of gradation/smoothness characteristics $Num_{Sco}(i,j)$ and $Den_{Sco}(i,j)$ for the SATV-correction-image pixel values Sco (i, j) at each pixel (i, j), by performing the following calculations (4):

$$Num_{Sco}(i,j) = pXX_{Sco} \times (1+pY_{Sco}^2) - 2 \times (pX_{Sco} \cdot pY_{Sco} \cdot pXY_{Sco}) + pYY_{Sco} \times (1+pX_{Sco}^2), pYY_{Sco} \times (1+pX_{Sco}^2)$$

$$Den_{Sco}(i,j) = (1+pX_{Sco} \cdot pY_{Sco} + pY_{Sco} \cdot pY_{Sco})^{1.5} \quad (4)$$

where:
$pX_{Sco} = [Sco(i+1,j) - Sco(i-1,j)]/2$,
$pXX_{Sco} = [Sco(i+1,j) + Sco(i-1,j)] - 2 \times Sco(i,j)$,
$pY_{Sco} = [Sco(i,j-1) - Sco(i,j+1)]/2$,
$pYY_{Sco} = [Sco(i,j-1) + Sco(i,j+1)] - 2 \times Sco(i,j)$,
$pXY_{Sco} = \{[Sco(i-1,j-1) + Sco(i+1,j+1)] - [Sco(i+1,j-1) + Sco(i-1,j+1)]\}/4$.

A variation characteristics value $Num_{Sco}(i,j)/Den_{Sco}(i,j)$ at each pixel location (i, j) indicates how pixel values Sco(i−1, j−1), Sco(i, j−1), Sco(i+1, j−1), Sco(i−1, j), Sco(i+1, j), Sco(i−1, j+1), Sco(i, j+1), and Sco(i+1, j+1) at pixels surrounding the target pixel location (i, j) vary relative to the pixel value Sco(i, j) at the target pixel location (i, j).

The CPU 21 then determines a parameter-determining value $\beta_{Sco}$ for the SATV-correction-image pixel values Sco(i, j), based on the sum of the differences between the original image pixel values I(i, j) and the SATV-correction-image pixel values Sco(i, j) weighted by the variation characteristics "$Num_{Sco}(i,j)/Den_{Sco}(i,j)$" at all M×N pixel locations (i, j), by performing the following calculation (5):

$$\beta_{Sco} = total_{Sco}/E \quad (5)$$

where $total_{Sco} = \Sigma_{i,j}\{(Num_{Sco}(i,j)/Den_{Sco}(i,j)) \times (I(i,j) - Sco(i,j))\}$.

The CPU 21 then determines the pixel-independent conversion parameter α by performing the following calculation (6):

$$\alpha = k' \times \beta_{Sco} \quad (6)$$

The pixel-independent conversion parameter α therefore has a uniform value over all M×N pixels.

Next, in S26, the CPU 21 sets the SATV-correction-image pixel values Sco (i, j) as SATV input-image pixel values Sin(i, j) to be subjected to the next SATV process.

Subsequently, the process returns to S23, in which the newly-set SATV input-image pixel values Sin(i, j) are subjected to the scaler TV process using the pixel-independent conversion parameter α that has just been determined in S25.

Figure 4:
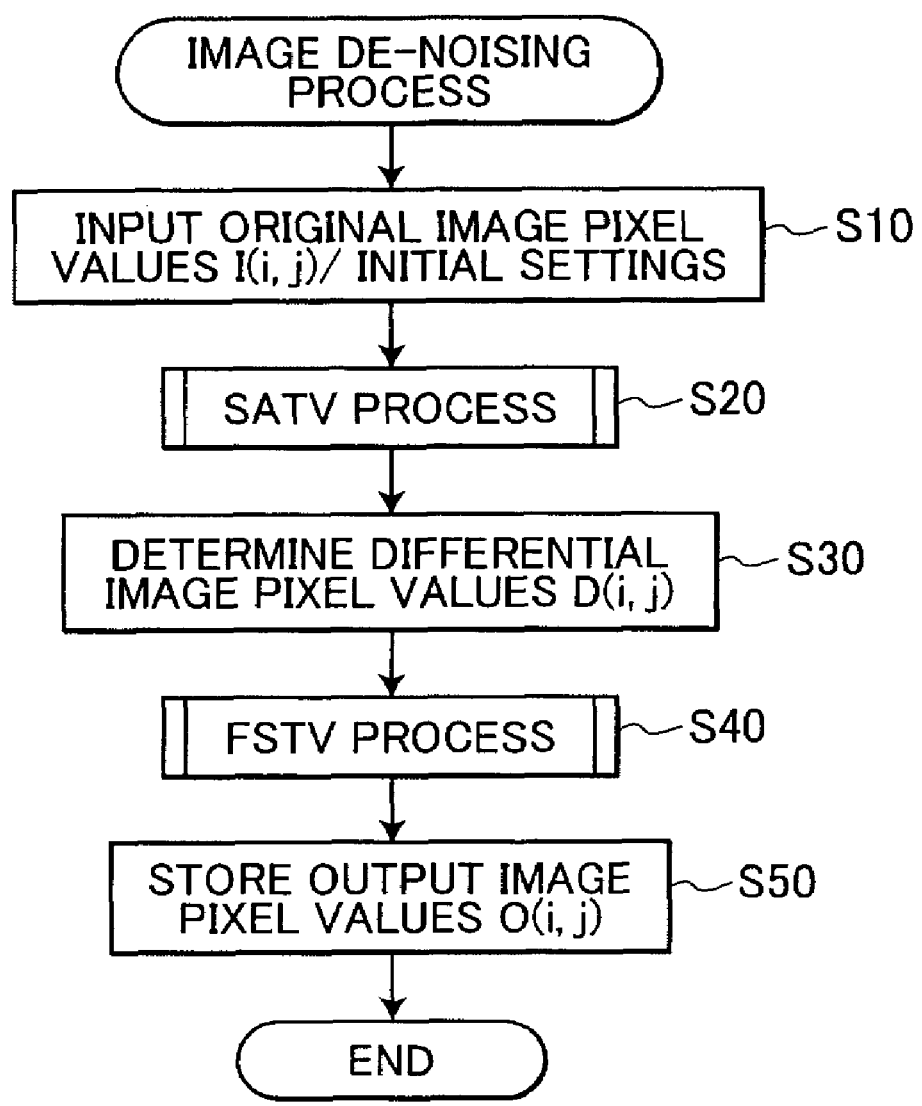
FIG. 4 is a flowchart of the image de-noising process.

However, in S24, when the changes from the SATV-input-image pixel values Sin(i, j) to the SATV-correction-image pixel values Sco(i, j) have sufficiently converged (yes in S24), the CPU 21 sets the SATV-correction-image pixel values Sco(i, j) as the provisional-correction-image pixel values J(i, j) in S27, and the process returns to S30 in the main routine of FIG. 4.

<Scaler TV>

Figure 6:
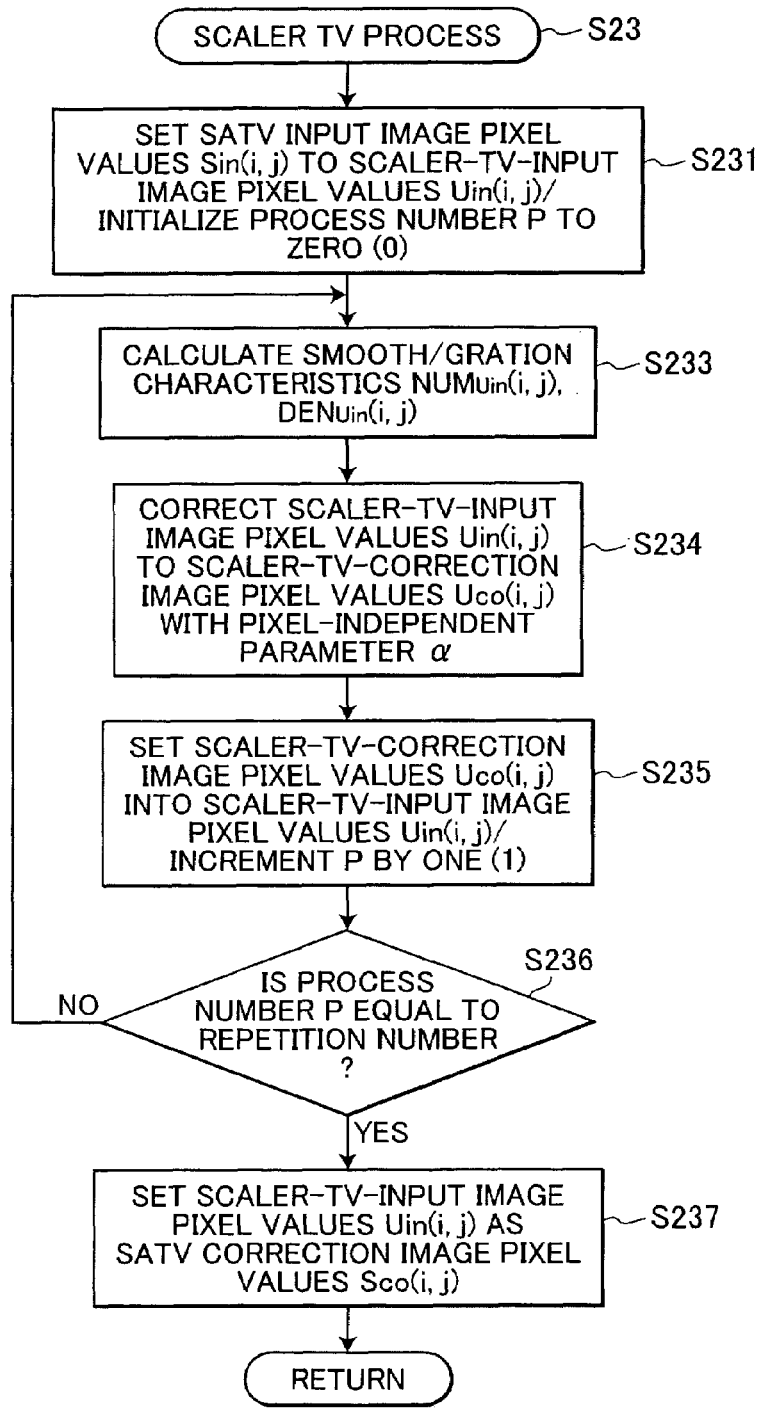
FIG. 6 is flowchart of a scaler TV process in the SATV process of FIG. 5.

Next, the scaler TV process of S23 will be described with reference to FIG. 6.

First, in S231, the CPU 21 sets the present SATV input image Sin as a scaler TV input image Uin to be subjected to the scaler TV process. In other words, the CPU 21 sets the present SATV-input-image pixel values Sin(i,j) as scaler-TV-input-image pixel values Uin(i, j). Also in S231, the CPU 21 initializes the process number P to zero (0).

Next, in S233, the CPU 21 determines a pair of gradation/smoothness characteristics "$Num_{Uin}(i, j)$" and "$Den_{Uin}(i, j)$" for the present scaler-TV-input-image pixel values Uin(i, j) at each pixel location (i, j), by performing the following calculations (7):

$$Num_{Uin}(i,j) = pXX_{Uin} \times (1+pY_{Uin}^2) + pYY_{Uin} \cdot pY_{Uin}^2) - 2 \times (pX_{Uin} \cdot pY_{Uin} \cdot pXY_{Uin}) + pYY_{Uin} \times (1+pX_{Uin}^2),$$

$$Den_{Uin}(i,j) = (1+pX_{Uin} \cdot pY_{Uin} + pY_{Uin} \cdot pY_{Uin})^{1.5} \quad (7)$$

where:
$pX_{Uin} = [Uin(i+1,j) - Uin(i-1,j)]/2$,
$pXX_{Uin} = [Uin(i+1,j) + Uin(i-1,j)] - 2 \times Uin(i,j)$,
$pY_{Uin} = [Uin(i,j-1) - Uin(i,j+1)]/2$,
$pYY_{Uin} = [Uin(i,j-1) + Uin(i,j+1)] - 2 \times Uin(i,j)$,
$pXY_{Uin} = \{[Uin(i-1,j-1) + Uin(i+1,j+1)] - [Uin(i+1,j-1) + Uin(i-1,j+1)]\}/4$.

A variation characteristics value $Num_{Uin}(i,j)/Den_{Uin}(i,j)$ at each pixel location (i, j) indicates how pixel values Uin(i−1, j−1), Uin(i, j−1), Uin(i+1, j−1), Uin(i−1, j), Uin(i+1, j), Uin(i−1, j+1), Uin(i, j+1), and Uin(i+1, j+1) at pixels surrounding the target pixel location (i, j) vary relative to the pixel value Uin(i, j) at the target pixel location (i, j).

Next, in S234, the CPU 21 corrects the scaler TV input image Uin, producing a scaler TV correction image Uco. Specifically, the CPU 21 converts the scaler-TV-input-image pixel values Uin(i, j) at each pixel location (i, j) into the scaler-TV-correction-image pixel values Uco(i, j) at the target pixel location (i, j) by performing the following calculation (8):

$$Uco(i,j) = Uin(i,j) + k \times \{(Num_{Uin}(i,j)/Den_{Uin}(i,j)) + \alpha \times (I(i,j) - Uin(i,j))\} \quad (8)$$

Accordingly, the scaler-TV-input-image pixel value Uin(i, j) at each pixel location (i, j) is converted into the scaler-TV-correction-image pixel value Uco(i, j) at the target pixel location (i, j) based on the variation characteristics value "$Num_{Uin}(i,j)/Den_{Uin}(i,j)$" at the target pixel location (i, j) and on the difference that is defined between the original image pixel value I(i, j) at the target pixel location (i, j) and the scaler-TV-input-image pixel value Uin(i, j) at the target pixel location (i, j) and that is weighted by the pixel-independent conversion parameter α which is fixed for all M×N pixels.

Next, in S235, the CPU 21 sets the scaler-TV-correction-image pixel values Uco(i, j), which have just been obtained in S234, as scaler-TV-input-image pixel values Uin(i, j) to be subjected to the next scaler TV process. Also in S235, the CPU 21 increments the process number P by one (1).

Next, in S236, the CPU 21 determines whether the process number P is greater than or equal to the repetition number R (ten, in this example). If the process number P has not yet reached the repetition number R (no in S236), the process returns to S233. In this case, the newly-set scaler-TV-input-image pixel values Uin(i, j) are corrected to produce scaler-TV-correction-image pixel values Uco(i, j) in S233-S234.

Thus, the image correction operation of S233-S235 is repeated the repetition number R times. When the image correction operation of S233-S235 is repeated the repetition number R times and, therefore, the process number P reaches the repetition number R (yes in S236), the process proceeds to S237, wherein the CPU 21 sets the last-obtained scaler-TV-input-image pixel values Uin(i, j) as the SATV-correction-image pixel values Sco(i, j).

Subsequently, the process returns to S24 in FIG. 5.

<FSTV>

Figure 7:
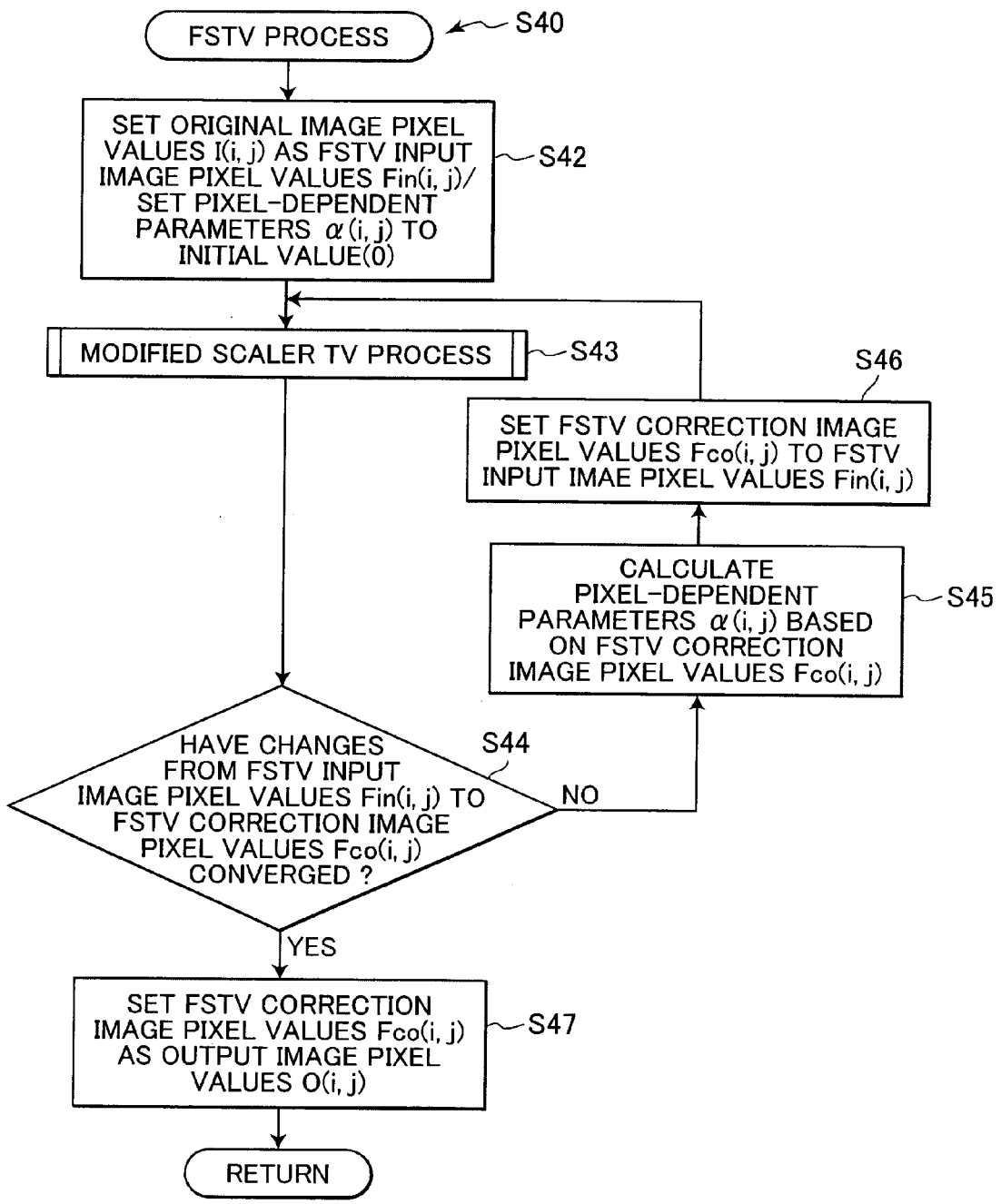
FIG. 7 is a flowchart of an FSTV process in the image de-noising process of FIG. 4.

Next, the FSTV process of S40 will be described with reference to FIG. 7.

First, in S42, the CPU 21 sets the original image I as a FSTV input image Fin to be subjected to the FSTV process. In other words, the CPU 21 sets the original-image pixel values I(i, j) as FSTV-input-image pixel values Fin(i, j) to be subjected to the SATV process. Also in S42, the CPU 21 initializes the pixel-dependent conversion parameters α (i, j) for all M×N pixel locations to zero (0).

Next, in S43, the CPU 21 executes the modified scaler TV process on the FSTV input image Fin to correct the FSTV input image Fin, producing a FSTV correction image Fco. That is, the CPU 21 executes the modified scaler TV process to convert the FSTV-input-image pixel values Fin(i, j) into FSTV-correction-image pixel values Fco(i, j).

Next, in S44, the CPU 21 compares all the FSTV-input-image pixel values Fin(i, j) and corresponding FSTV-correction-image pixel values Fco(i, j) and determines whether changes from the FSTV-input-image pixel values Fin(i, j) to the FSTV-correction-image pixel values Fco(i, j) have sufficiently converged.

More specifically, in S44, the CPU 21 calculates a difference-square-sum $DSS_{FSTV}$ between the FSTV-input-image pixel values Fin(i, j) and the FSTV-correction-image pixel values Fco(i, j). The difference-square-sum $DSS_{FSTV}$ is defined as the sum of the differences between the FSTV-input-image pixel values Fin(i, j) and the FSTV-correction-image pixel values Fco(i, j) squared for all N×M pixels. That is, the CPU 21 calculates the following formula (9):

$$DSS_{FSTV} = \Sigma_{i,j}(|Fin(i,j) - Fco(i,j)|^2) \quad (9)$$

The CPU 21 then compares the difference-square-sum $DSS_{FSTV}$ with the threshold th. When the difference-square-sum $DSS_{FSTV}$ is greater than the threshold th, the CPU 21 determines that the changes from the FSTV-input-image pixel values Fin(i, j) to the FSTV-correction-image pixel values Fco(i, j) have not yet converged. However, when the difference-square-sum $DSS_{FSTV}$ is smaller than or equal to the threshold th, the CPU 21 determines that the changes from the FSTV-input-image pixel values Fin(i, j) to the FSTV-correction-image pixel values Fco(i, j) have sufficiently converged.

When the changes from the FSTV-input-image pixel values Fin(i, j) to the FSTV-correction-image pixel values Fco(i, j) have not yet converged (no in S44), the process proceeds to S45.

In s45, the CPU 21 calculates the pixel-dependent conversion parameters α(i, j) for the FSTV-correction-image pixel values Fco (i, j) at each pixel location (i, j).

More specifically, in S45, the CPU 21 first determines a pair of gradation/smoothness characteristics $Num_{Fco}(i, j)$ and $Den_{Fco}(i, j)$ for the FSTV-correction-image pixel values Fco (i, j) at each pixel (i, j), by performing the following calculations (10):

$$Num_{Fco}(i,j) = pXX_{Fco} \times (1 + pY_{Fco}^2) - 2 \times (pX_{Fco} \cdot pY_{Fco} \cdot pXY_{Fco}) + pYY_{Fco} \times (1 + pX_{Fco}^2),$$

$$Den_{Fco}(i,j) = (1 + pX_{Fco} \cdot pY_{Fco} + pY_{Fco} \cdot pY_{Fco})^{1.5} \quad (10)$$

where:

$pX_{Fco} = [Fco(i+1, j) - Fco(i-1, j)]/2$, $pXX_{Fco} = [Fco(i+1, j) + Fco(i-1, j)] - 2 \times Fco(i, j)$, $pY_{Fco} = [Fco(i, j-1) - Fco(i, j+1)]/2$, $pYY_{Fco} = [Fco(i, j-1) + Fco(i, j+1)] - 2 \times Fco(i, j)$, $pXY_{Fco} = \{[Fco(i-1, j-1) + Fco(i+1, j+1)] - [Fco(i+1, j-1) + Fco(i-1, j+1)]\}/4$.

A variation characteristics value $Num_{Fco}(i, j)/Den_{Fco}(i, j)$ at each pixel location (i, j) indicates how pixel values Fco(i−1, j−1), Fco(i, j−1), Fco(i+1, j−1), Fco(i−1, j), Fco(i+1, j), Fco(i−1, j+1), Fco(i, j+1), and Fco(i+1, j+1) at pixels surrounding the target pixel location (i, j) vary relative to the pixel value Fco(i, j) at the target pixel location (i, j).

The CPU 21 then determines a parameter-determining value $\beta_{Fco}$ for the FSTV-correction-image pixel values Fco(i, j), based on the sum of the differences between the original image pixel values I(i, j) and the FSTV-correction-image pixel values Fco(i, j) weighted by the variation characteristics "$Num_{Fco}(i, j)/Den_{Fco}(i, j)$" at all M×N pixel locations (i, j), by performing the following calculation (11):

$$\beta_{Fco} = total_{Fco}/E \quad (11)$$

where $total_{Fco} = \Sigma_{i,j} \{(Num_{Fco}(i, j)/Den_{Fco}(i, j)) \times (I(i, j) - Fco(i, j))\}$.

The CPU 21 then determines the pixel-dependent conversion parameters α (i, j) at each pixel location (i, j) by performing the following calculation (12):

$$\alpha(i,j) = k \times \beta_{Fco} \times D(i,j) \quad (12)$$

The pixel-dependent conversion parameter α (i, j) at each pixel location (i, j) therefore has a value dependent on the differential-image pixel value D(i, j) at the target pixel location (i, j).

Next, in S46, the CPU 21 sets the FSTV-correction-image pixel values Fco(i, j) as FSTV input-image pixel values Fin(i, j) to be subjected to the next FSTV process.

Subsequently, the process returns to S43, in which the newly-set FSTV input-image pixel values Fin(i, j) are subjected to the modified scaler TV process using the pixel-dependent conversion parameters α(i, j) that have just been determined in S45.

However, in S44, when the changes from the FSTV-input-image pixel values Fin(i, j) to the FSTV-correction-image pixel values Fco(i, j) have sufficiently converged (yes in S44), the CPU 21 sets the FSTV-correction-image pixel values Fco(i, j) as the output-image pixel values O(i, j) in S47, and the process returns to S50 in the main routine of FIG. 4.

<Modified Scaler TV>

Figure 8:
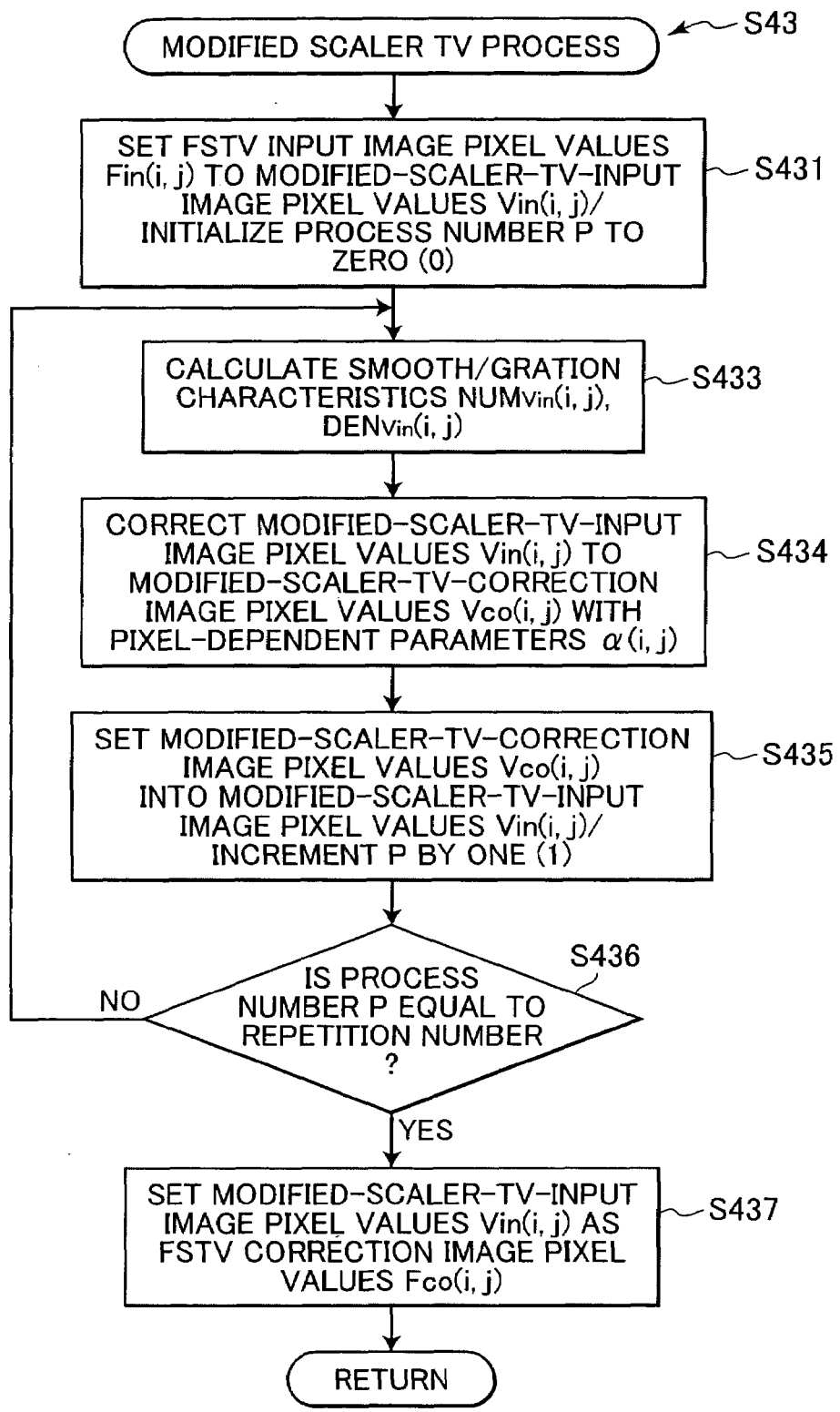
FIG. 8 is flowchart of a modified scaler TV process in the FSTV process of FIG. 7.

Next, the modified scaler TV process of S43 will be described with reference to FIG. 8.

First, in S431, the CPU 21 sets the present FSTV input image Fin as a modified scaler TV input image Vin to be subjected to the modified scaler TV process. In other words, the CPU 21 sets the present FSTV-input-image pixel values Fin(i, j) as modified-scaler-TV-input-image pixel values Vin (i, j). Also in S431, the CPU 21 initializes the process number P to zero (0).

Next, in S433, the CPU 21 determines a pair of gradation/smoothness characteristics "$Num_{Vin}(i, j)$" and "$Den_{Vin}(i, j)$" for the present modified-scaler-TV-input-image pixel values Vin(i, j) at each pixel location (i, j), by performing the following calculations (13):

$$Num_{Vin}(i,j) = pXX_{Vin} \times (1+pY_{Vin}^2) - 2 \times (pX_{Vin} \cdot pY_{Vin} \cdot pXY_{Vin}) + pYY_{Vin} \times (1+pX_{Vin}^2),$$

$$Den_{Vin}(i,j) = (1+pX_{Vin} \cdot pY_{Vin} + pY_{Vin} \cdot pY_{Vin})^{1.5} \quad (13)$$

where:
$pX_{Vin}$=[Vin(i+1, j)−Vin(i−1, j)]/2,
$pXX_{Vin}$=[Vin(i+1, j)+Vin(i−1, j)]−2×Vin(i, j),
$pY_{Vin}$=[Vin(i, j−1)−Vin(i, j+1)]/2,
$pYY_{Vin}$=[Vin(i, j−1)+Vin(i, j+1)]−2×Vin(i, j),
$pXY_{Vin}$={[Vin(i−1, j−1) +Vin(i+1, j+1)]−[Vin(i+1, j−1)+Vin (i−1, j+1)]}/4.

A variation characteristics value $Num_{Vin}(i,j)/Den_{Vin}(i,j)$ at each pixel location (i, j) indicates how pixel values Vin(i−1, j−1), Vin(i, j−1), Vin(i+1, j−1), Vin(i−1, j), Vin(i+1, j), Vin(i−1, j+1), Vin(i, j+1), and Vin(i+1, j+1) at pixels surrounding the target pixel location (i, j) vary relative to the pixel value Vin(i, j) at the target pixel location (i, j).

Next, in S434, the CPU 21 corrects the modified scaler TV input image Vin, producing a modified scaler TV correction image Vco. Specifically, the CPU 21 converts the modified-scaler-TV-input-image pixel value Vin(i, j) at each pixel location (i, j) into a modified-scaler-TV-correction-image pixel value Vco(i, j) at the target pixel location (i, j) by performing the following calculation (14):

$$Vco(i,j) = Vin(i,j) + k \times \{(Num_{Vin}(i,j)/Den_{Vin}(i,j)) + \alpha(i,j)(I(i,j) - Vin(i,j))\} \quad (14)$$

Accordingly, the modified-scaler-TV-input-image pixel value Vin(i, j) at each pixel location (i, j) is converted into the modified-scaler-TV-correction-image pixel value Vco(i, j) at the target pixel location (i, j) based on the variation characteristics value "$Num_{Vin}(i, j)/Den_{Vin}(i, j)$" at the target pixel location (i, j) and on the difference that is defined between the original image pixel value I(i, j) at the target pixel location (i, j) and the modified-scaler-TV-input-image pixel value Vin(i, j) at the target pixel location (i, j) and that is weighted by the pixel-dependent conversion parameter α (i, j) which varies according to the pixel location (i, j).

Next, in S435, the CPU 21 sets the modified-scaler-TV-correction-image pixel values Vco(i, j), which have just been obtained in S434, as modified-scaler-TV-input-image pixel values Vin(i, j) to be subjected to the next modified scaler TV process. Also in S435, the CPU 21 increments the process number P by one (1).

Next, in S436, the CPU 21 determines whether the process number P is greater than or equal to the repetition number R (ten, in this example). If the process number P has not yet reached the repetition number R (no in S436), the process returns to S433. Then, the newly-set modified-scaler-TV-input-image pixel values Vin(i, j) are corrected to produce modified-scaler-TV-correction-image pixel values Vco(i, j) in S433-S434.

Thus, the image correction operation of S433-S435 is repeated the repetition number R times. When the image correction operation of S433-S435 is repeated the repetition number R times and, therefore, the process number P reaches the repetition number R (yes in S436), the process proceeds to S437, wherein the CPU 21 sets the last-obtained modified-scaler-TV-input-image pixel values Vin(i, j) as the FSTV-correction-image pixel values Fco(i, j).

Subsequently, the process returns to S44 in FIG. 7.

As described above, according to the present embodiment, while processes S23, S24, S25, and S26 are executed in an iterative loop in the SATV process of S20, the pixel-independent parameter α is determined in S25 adaptively based on the value "$\Sigma_{i,j}\{(Num_{Sco}(i,j)/Den_{Sco}(i,j)) \times (I(i,j) - Sco(i,j))\}$", that is, based on the sum of the differences between I(i, j) and Sco(i, j) weighted by the variation characteristics $Num_{Sco}(i, j)/Den_{Sco}(i, j)$ for all M×N pixels. Accordingly, the pixel-independent parameter α has a fixed value for all M×N pixels.

Processes S233-S236 are executed in a subsidiary iterative loop in the scaler TV process of S23. At each step in the subsidiary iterative loop, the image pixel value Uin(i, j) is corrected in S234 by adding, to the image pixel value Uin(i,j), the value "$k \times (Num_{Uin}(i,j)/Den_{Uin}(i,j))$", which indicates the state of pixel-value variation around the target pixel location (i, j), and value "$k \times \alpha \times (I(i,j) - Uin(i,j))$", which indicates the difference between the original image pixel value I(i, j) and the image pixel value Uin(i, j), weighted by the parameters α and k. As the processes S233-S236 are executed iteratively, the amount "$\{k \times (Num_{Uin}(i,j)/Den_{Uin}(i,j)) + k \times \alpha \times (I(i,j) - Uin (i,j))\}$" is gradually amplified. The provisional correction image J is obtained through the SATV process of S20. The provisional correction image J is free from noise, while preserving the features of the original image I. However, small details and textures that are defined by sharp edges appearing in the original image I will possibly be lost from the provisional correction image J.

While processes of S43, S44, S45, and S46 are executed in an iterative loop in the FSTV process of S40, the pixel-dependent parameter α(i, j) at each pixel location (i, j) is determined in S45 adaptively based on: the value "$\Sigma_{i,j}\{(Num_{Fco}(i,j)/Den_{Fco}(i,j)) \times (I(i,j) - Fco(i,j))\}$", that is, the sum of the differences between I(i, j) and Fco(i, j) weighted by the variation characteristics $Num_{Fco}(i,j)/Den_{Fco}(i,j)$ for all M×N pixels; and the differential image pixel value D(i, j) between the original image pixel value I(i, j) and provisional correction image pixel value J(i, j). The pixel-dependent parameter α (i,j) has a value that varies dependently on the pixel location (i, j).

Processes S433-S436 are executed in another subsidiary iterative loop in the modified scaler TV process of S43. At each step in the subsidiary iterative loop, the image pixel value Vin(i, j) is corrected in S434 by adding, to the image pixel value Vin(i, j), the value "k×(Num$_{Vin}$(i, j)/Den$_{Vin}$(i, j))", which indicates the state of pixel-value variation around the target pixel location (i, j), and the value "k×α(i, j)×(I(i, j)−Vin (i, j))", which indicates the difference between the original image pixel value I(i, j) and the image pixel value Vin(i, j), weighted by the parameters α(i, j) and k. As the processes of S433-S436 are executed iteratively, the amount "{k×(Num$_{Vin}$(i, j)/Den$_{Vin}$(i, j))+k×α(i, j)×(I(i, j)−Vin(i, j))}" is gradually amplified. The output image O is obtained through the FSTV process of S40. The output image O is free from noise, while preserving the features of the original image I. Because the value of the parameter α (i, j) varies dependently on the pixel location (i, j) according to the differential image pixel value D(i, j) between the original image pixel value I(i, j) and the provisional correction image pixel value J(i, j), the small details and textures that are lost from the provisional correction image J are successfully retained in the output image O.

<Experiment>

Figure 9A:
FIG. 9(a) is an example of an original image subjected to the image de-noising process of the present embodiment.

The present inventors performed an experiment in which an original image I, shown in FIG. 9(a), was subjected to the image de-noising process of the present embodiment. The original image I was a picture of a teddy bear taken with a digital camera. As shown in FIG. 9(a), the teddy bear depicted in the original image I is wearing a shirt with a checkered pattern. However, the original image I also contains noise.

Figure 9B:
FIG. 9(b) is a provisional correction image obtained through the SATV process based on the original image of FIG. 9(a)

Accordingly, this original image I was subjected to the SATV process of S20 using the pixel-independent conversion parameter α. As a result, the provisional correction image J shown in FIG. 9(b) was obtained. Noise seen in the original image I is no longer present in the provisional correction image J. The provisional correction image J preserves the features of the original image I, except for its small details and textures. That is, the small details and textures of the checkered pattern were lost in the SATV process.

Figure 9C:
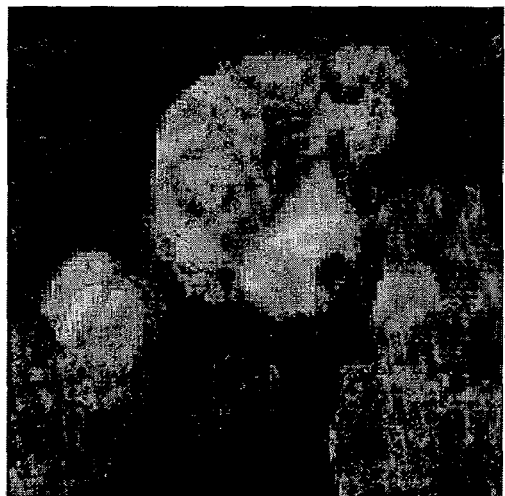
FIG. 9(c) is an output image obtained through the FSTV process based on the original image of FIG. 9(a) and the provisional correction image of FIG. 9(b).

Subsequently, the original image I was subjected to the FSTV process of S40 using the pixel-dependent conversion parameter α (i, j), which was determined based on the differential image D between the original image I and the provisional correction image J. As a result, the output image O shown in FIG. 9(c) was obtained. As is apparent from FIG. 9(c), noise present in the original image I has been successfully removed in the output image O. Moreover, the output image O preserves the features of the original image I, including the small details and textures of the checkered pattern.

While the invention has been described in detail with reference to the specific embodiment thereof, it would be apparent to those skilled in the art that various changes and modifications may be made therein without departing from the spirit of the invention.

For example, in S20 of the above-described embodiment, the SATV process is executed to correct the original image I, resulting in the provisional correction image J. However, other various noise removal processes can be executed in S20 to correct the original image I. For example, the process of S25 may be omitted from S20. In other words, the scaler TV process of S23 is executed iteratively in S20, without adaptively changing the conversion parameter α.

The variation characteristics "Num(i, j)/Den(i, j)" for a pixel location (i, j) may be defined differently from those described above in (1), (4), (7), (10), (13) as long as the variation characteristics "Num(i, j)/Den(i, j)" for the pixel location (i, j) indicate a filtering result of pixel values at the target pixel location (i, j) and at other pixel locations that surround the target pixel location (i, j). The pixel locations surrounding the target pixel location (i, j) may not be limited to the eight pixel locations (i−1, j−1), (i, j−1), (i+1, j−1), (i−1, j), (i+1, j), (i−1, j+1), (i, j+1), and (i+1, j+1), but may be more or less than eight pixel locations that surround the target pixel location (i, j).

The correction adjustment coefficient k used during S234 may have a value different from the correction adjustment coefficient k used during S434. The parameter adjustment coefficient k' used during S25 may have a value different from the parameter adjustment coefficient k' used during S45. The threshold th used during S24 may have a value different from the threshold th used during S44. The repetition number R used during S236 may have a value different from the repetition number R used during S436.

In the above description, the pixel value in each image is an eight-bit value. However, the pixel value in each image may be other than the eight-bit value.

What is claimed is:

1. An image de-noising method, comprising:
   processing an original image to generate an intermediate correction image, the original image having a plurality of pixels that are arranged two-dimensionally, each pixel in the original image having a pixel value, the intermediate correction image having a plurality of pixels that are arranged two-dimensionally with a one-to-one correspondence with the plurality of pixels of the original image, each pixel in the intermediate correction image having a corrected pixel value;
   determining a differential image between the original image and the intermediate correction image, the differential image having a plurality of pixels that are arranged two-dimensionally with a one-to-one correspondence with the plurality of pixels of the original image, the differential image having, for each pixel, a differential pixel value equal to a difference between the pixel value of the corresponding pixel in the original image and the corrected pixel value of the corresponding pixel in the intermediate correction image; and
   determining a pixel-dependent conversion parameter at each pixel based on the differential pixel value at the each pixel in the differential image and processing the original image using the pixel-dependent conversion parameter to generate a final correction image, the final correction image having a plurality of pixels that are arranged two-dimensionally with a one-to-one correspondence with the plurality of pixels of the original image.

2. An image de-noising method as claimed in claim 1, wherein the original image is corrected into the final correction image by correcting the pixel value at each pixel in the original image based on: the pixel-dependent conversion parameter at the each pixel; and pixel-value variation characteristics at the each pixel, the pixel-value variation characteristics at the each pixel indicating variation in the pixel values at pixels surrounding the each pixel.

3. An image de-noising method as claimed in claim 2, wherein the original image is corrected into the intermediate correction image by correcting the pixel value at each pixel in the original image based on: a pixel-independent conversion parameter that is uniform for all the pixels of the original image; and the pixel-value variation characteristics at the each pixel.

4. An image de-noising method as claimed in claim 3, wherein the determining a pixel-dependent conversion parameter and correcting the original image to the final correction image includes:
   executing a main iterative loop to correct the original image to the final correction image, the main iterative loop including a successive series of at least one main stage, each main stage correcting a main input image into a main output image, the successive series of at least one main stage including a first main stage that is executed first among the successive series of at least one main stage, the successive series of at least one main stage including a last main stage that is executed last among the successive series of at least one main stage, the last main stage being either the first main stage or a main stage other than the first main stage, each main stage including:

(A) setting a main input image, the operation (A) during the first main stage setting the original image as the main input image, the operation (A) during a main stage other than the first main stage setting a main output image resulting from a main stage prior to the subject main stage as the main input image for the subject main stage;

(B) correcting the main input image into a main output image, by correcting the pixel value at each pixel of the main input image based on a pixel-dependent conversion parameter at the each pixel, the pixel-dependent conversion parameter at the each pixel during the first main stage having a predetermined value, the pixel-dependent conversion parameter at the each pixel during the main stage other than the first main stage having a value that has been determined for the each pixel during a main stage prior to the subject main stage; and (C) judging whether or not a difference between the main input image and the main output image is greater than a first predetermined threshold, wherein during a main stage other than the last main stage, the difference becomes greater than the first predetermined threshold, wherein during the last main stage, the difference becomes smaller than or equal to the first predetermined threshold, wherein each main stage other than the last main stage further includes:

(D) determining the pixel-dependent conversion parameter at each pixel based on:

the pixel value at the each pixel in the differential image; and a sum of weighted differences over all the pixels, the weighted difference at each pixel having a value equal to a difference that is defined between the pixel value at the each pixel of the main output image and the pixel value at the each pixel of the original image and that is weighted by the pixel-value variation characteristics at the each pixel in the main output image, wherein the last main stage further includes:

(E) setting a main output image that results from the operation (B) in the last main stage as the final correction image, and stopping the main iterative loop, wherein the operation (B) at each main stage includes:

executing a subsidiary iterative loop to correct the main input image to the main output image, the subsidiary iterative loop including a successive series of subsidiary stages, each subsidiary stage correcting a subsidiary input image to a subsidiary output image, the successive series of subsidiary stages including a predetermined number of subsidiary stages that includes a first subsidiary stage that is executed first among the predetermined number of subsidiary stages and a last subsidiary stage that is executed last among the predetermined number of subsidiary stages, each subsidiary stage during each main stage including:

(F) setting a subsidiary input image, the operation (F) during the first subsidiary stage setting the main input image for the subject main stage as the subsidiary input image, the operation (F) during a subsidiary stage other than the first subsidiary stage setting a subsidiary output image resulting from a subsidiary stage prior to the subject subsidiary stage as the subsidiary input image for the subject subsidiary stage; and (G) correcting the subsidiary input image into a subsidiary output image, by correcting the pixel value at each pixel of the subsidiary input image based on:

a difference that is defined between the pixel value at the each pixel of the subsidiary input image and the pixel value at the each pixel of the original image and that is weighted by the pixel-dependent conversion parameter at the each pixel that has been determined in the operation (D) during a main stage prior to the subject main stage; and the pixel-value variation characteristics at the each pixel of the subsidiary input image, wherein the last subsidiary stage during each main stage further includes:

(H) setting a subsidiary output image that results from the operation (G) in the last subsidiary stage as the main output image for the subject main stage, and stopping the subsidiary iterative loop.

5. An image de-noising method as claimed in claim 4, wherein correcting the original image to the intermediate correction image includes:

executing an additional main iterative loop to correct the original image to the intermediate correction image, the additional main iterative loop including a successive series of at least one additional main stage, each additional main stage correcting an additional main input image into an additional main output image, the successive series of at least one additional main stage including a first additional main stage that is executed first among the successive series of at least one additional main stage, the successive series of at least one additional main stage including a last additional main stage that is executed last among the successive series of at least one additional main stage, the last additional main stage being either the first additional main stage or a additional main stage other than the first additional main stage, each additional main stage including:

(a) setting an additional main input image, the operation (a) during the first additional main stage setting the original image as the additional main input image, the operation (a) during an additional main stage other than the first additional main stage setting an additional main output image resulting from an additional main stage prior to the subject additional main stage as the additional main input image for the subject additional main stage;

(b) correcting the additional main input image into an additional main output image, by correcting the pixel value at each pixel of the additional main input image based on the pixel-independent conversion parameter, the pixel-independent conversion parameter during the first additional main stage having a predetermined value, the pixel-independent conversion parameter during the additional main stage other than the first additional main stage having a value that has been determined during an additional main stage prior to the subject additional main stage; and (c) judging whether or not a difference between the additional main input image and the additional main output image is greater than a second predetermined threshold, wherein during an additional main stage other than the last additional main stage, the difference becomes greater than the second predetermined threshold, wherein during the last additional main stage, the difference becomes smaller than or equal to the second predetermined threshold, wherein each additional main stage other than the last additional main stage further includes:

(d) determining the pixel-independent conversion parameter based on a sum of weighted differences over all the pixels, the weighted difference at each pixel having a value equal to a difference that is defined between the pixel value at the each pixel of the additional main output image and the pixel value at the each pixel of the original image and that is weighted by the pixel-value variation characteristics at the each pixel in the additional main output image, wherein the last additional main stage further includes:

(e) setting an additional main output image that results from the operation (b) in the last additional main stage as the intermediate correction image, and stopping the additional main iterative loop, wherein the operation (b) at each additional main stage includes:

executing an additional subsidiary iterative loop to correct the additional main input image to the additional main output image, the additional subsidiary iterative loop including a successive series of additional subsidiary stages, each additional subsidiary stage correcting an additional subsidiary input image to an additional subsidiary output image, the successive series of additional subsidiary stages including an another predetermined number of additional subsidiary stages that includes a first additional subsidiary stage that is executed first among the another predetermined number of additional subsidiary stages and a last additional subsidiary stage that is executed last among the another predetermined number of additional subsidiary stages, each additional subsidiary stage during each additional main stage including:

(f) setting an additional subsidiary input image, the operation (f) during the first additional subsidiary stage setting the additional main input image for the subject additional main stage as the additional subsidiary input image, the operation (f) during an additional subsidiary stage other than the first additional subsidiary stage setting an additional subsidiary output image resulting from an additional subsidiary stage prior to the subject additional subsidiary stage as the additional subsidiary input image for the subject additional subsidiary stage; and (g) correcting the additional subsidiary input image into an additional subsidiary output image, by correcting the pixel value at each pixel of the additional subsidiary input image based on:

a difference that is defined between the pixel value at the each pixel of the additional subsidiary input image and the pixel value at the each pixel of the original image and that is weighted by the pixel-independent conversion parameter that has been determined in the operation (d) during an additional main stage prior to the subject additional main stage; and the pixel-value variation characteristics at the each pixel of the additional subsidiary input image, wherein the last additional subsidiary stage during each additional main stage further includes:

(h) setting an additional subsidiary output image that results from the operation (g) in the last additional subsidiary stage as the additional main output image for the subject additional main stage, and stopping the additional subsidiary iterative loop.

6. An image de-noising method as claimed in claim 3, wherein the determining a pixel-dependent conversion parameter and correcting the original image into the final correction image includes:

executing a main start-setting process to set an image Fin to be corrected through a modified scaler TV process;

executing a modified scaler TV process to correct the image Fin into a corrected image Fco;

executing a judging process to judge whether an amount of change between the image Fin and the image Fco is smaller than or equal to a threshold; and when the amount of change between the image Fin and the image Fco is greater than the threshold, executing a determining process to determine a pixel-dependent conversion parameter α (i, j) at each pixel (i, j) in the corrected image Fco by calculating the following formula:

$$\alpha(i,j)=k'\times D(i,j)\times \Sigma_{i,j}\{(Num_{Fco}(i,j)/Den_{Fco}(i,j))\times (I(i,j)-Fco(i,j))\}/E,$$

wherein D(i, j) is a pixel value at the each pixel (i, j) in the differential image D, (i, j) indicates a pixel location in an i-th column in a j-th row, where i is an integer greater than zero (0) and j is an integer greater than zero (0), the column and the row extending in predetermined directions substantially perpendicularly to each other, I(i, j) is a pixel value at the each pixel location (i, j) in the original image I, Fco(i, j) is a pixel value at the each pixel location (i, j) in the corrected image Fco, k' is a parameter adjustment coefficient, E is a noise coefficient, and $Num_{Fco}(i,j)/Den_{Fco}(i,j)$ is pixel-value variation characteristics at the each pixel location (i, j) in the image Fco, where:

$Num_{Fco}(i, j)=pXX_{Fco}\times(1+pY_{Fco}^2)-2\times(pX_{Fco}\cdot pY_{Fco}\cdot pXY_{Fco})+pYY_{Fco}\times(1+pX_{Fco}^2),$ $Den_{Fco}(i, j)=(1+pX_{Fco}\cdot pY_{Fco}+pY_{Fco}\cdot pY_{Fco})^{1.5},$ $pX_{Fco}=[Fco(i+1, j)-Fco(i-1, j)]/2,$ $pXX_{Fco}=[Fco(i+1, j)+Fco(i-1, j)]-2\times Fco(i, j),$ $pY_{Fco}=[Fco(i, j-1)-Fco(i, j+1)]/2,$ $pYY_{Fco}=[Fco(i, j-1)+Fco(i, j+1)]-2\times Fco(i, j),$ $pXY_{Fco}=\{[Fco(i-1, j-1)+Fco(i+1, j+1)]-[Fco(i+1, j-1)+Fco(i-1, j+1)]\}/4;$ wherein until the judging process determines that the amount of change between the image Fin and the image Fco is smaller than or equal to the threshold, a series of the main start-setting process, the modified scaler TV process, the judging process, and the determining process are executed repeatedly as a main iterative loop, and when the judging process determines that the amount of change between the image Fin and the image Fco becomes smaller than or equal to the threshold, after executing the judging process, a final-setting process is executed, instead of the determining process, to set the image Fco that has been obtained through the last-executed modified scaler TV process as the final correction image O, when the main start-setting process is executed the first time, the main start-setting process sets the original image I as the image Fin, and when the main start-setting process is executed other than the first time, the main start-setting process sets, as the image Fin, a corrected image Fco that has been obtained during a modified scaler TV process that has been executed prior to the main start-setting process, wherein the modified scaler TV process includes:

executing a subsidiary start-setting process to set an image Vin to be corrected through the present modified scaler TV process; and executing a correction process to correct the image Vin to a corrected image Vco by correcting the pixel value Vin(i, j) at each pixel (i, j) in the image Vin into a pixel value Vco (i, j) at the each pixel (i, j) in the corrected image Vco by performing the following calculation:

$$Vco(i,j)=Vin(i,j)+k\times\{(Num_{Vin}(i,j)/Den_{Vin}(i,j))+\alpha(i,j)(I(i,j)-Vin(i,j))\},$$

wherein k is a correction adjustment coefficient, $Num_{Vin}(i,j)/Den_{Vin}(i,j)$ is pixel-value variation characteristics at the each pixel (i, j) in the image Vin, where:

$Num_{Vin}(i,j)=pXX_{Vin}\times(1+pY_{Vin}^2)-2\times(pX_{Vin}\cdot pY_{Vin}\cdot pXY_{Vin})+pYY_{Vin}\times(1+pX_{Vin}^2),$ $Den_{Vin}(i,j)=(1+pX_{Vin}\cdot pY_{Vin}+pY_{vin}\cdot pY_{Vin}),$ $pX_{Vin}=[Vin(i+1,j)-Vin(i-1,j)]/2,$ $pXX_{Vin}=[Vin(i+1,j)+Vin(i-1,j)]-2\times Vin(i,j),$ $pY_{Vin}=[Vin(i,j-1)-Vin(i,j+1)]/2,$ $pYY_{Vin}=[Vin(i,j-1)+Vin(i,j+1)]-2\times Vin(i,j),$ $pXY_{Vin}=\{[Vin(i-1,j-1)+Vin(i+1,j+1)]-[Vin(i+1,j-1)+Vin(i-1,j+1)]\}/4,$ wherein when the modified scaler TV process is executed for the first time, α (i, j) has the value of zero (0), when the modified scaler TV process is executed other than the first time, α (i, j) has a value that has been determined by a determining process that has been executed prior to the present modified scaler TV process;

wherein a series of the subsidiary start-setting process and the correction process is repeatedly executed as a subsidiary iterative loop until the series of the subsidiary start-setting process and the correction process are executed a predetermined repetition number of times; and when the subsidiary start-setting process and the correction process have been executed the predetermined repetition number of times, after executing the correction process, another final-setting process is executed to set the corrected image Vco that is obtained through the last-executed correction process as a corrected image Fco that is obtained through the present modified scaler TV process, when the subsidiary start-setting process is executed the first time during the present modified scaler TV process, the subsidiary start-setting process sets, as the image Vin, the image Fin that has been set during the main start-setting process in the present modified scaler TV process, when the subsidiary start-setting process is executed other than the first time during the present modified scaler TV process, the subsidiary start-setting process sets, as the image Vin, a corrected image Vco that has been obtained during a correction process that has been executed prior to the present subsidiary start-setting process.

7. An image de-noising method as claimed in claim 6, wherein the correcting the original image into the intermediate correction image includes:

executing an additional main start-setting process to set an image Sin to be corrected through the scaler TV process;

executing a scaler TV process to correct the image Sin into a corrected image Sco;

executing an additional judging process to judge whether an amount of change between the image Sin and the image Sco is smaller than or equal to the threshold; and when the amount of change between the image Sin and the image Sco is greater than the threshold, executing an additional determining process to determine a pixel-independent conversion parameter α for all the pixels in the corrected image Sco by calculating the following formula:

$$\alpha=k'\times\Sigma_{i,j}\{(Num_{Sco}(i,j)/Den_{Sco}(i,j))\times(I(i,j)-Sco(i,j))\}/E,$$

wherein Sco(i, j) is a pixel value at the each pixel location (i, j) in the corrected image Sco, and $Num_{Sco}(i,j)/Den_{Sco}(i,j)$ is pixel-value variation characteristics at the each pixel location (i, j) in the image Sco, where:

$Num_{Sco}(i,j)=pXX_{Sco}\times(1+pY_{Sco}^2)-2\times(pX_{Sco}\cdot pY_{Sco}\cdot pXY_{Sco})+pYY_{Sco}\times(1+pX_{Sco}^2),$ $Den_{Sco}(i,j)=(1+pX_{Sco}\cdot pY_{Sco}+pY_{Sco}\cdot pY_{Sco})^{1.5},$ $pX_{Sco}=[Sco(i+1,j)-Sco(i-1,j)]/2,$ $pXX_{Sco}=[Sco(i+1,j)+Sco(i-1,j)]-2\times Sco(i,j),$ $pY_{Sco}=[Sco(i,j-1)-Sco(i,j+1)]/2,$ $pYY_{Sco}=[Sco(i,j-1)+Sco(i,j+1)]-2\times Sco(i,j),$ $pXY_{Sco}=\{[Sco(i-1,j-1)+Sco(i+1,j+1)]-[Sco(i+1,j-1)+Sco(i-1,j+1)]\}/4;$ wherein until the additional judging process determines that the amount of change between the image Sin and the image Sco is smaller than or equal to the threshold, a series of the additional main start-setting process, the scaler TV process, the additional judging process, and the additional determining process are executed repeatedly as an additional main iterative loop, and when the additional judging process determines that the amount of change between the image Sin and the image Sco becomes smaller than or equal to the threshold, after executing the additional judging process, an additional final-setting process is executed, instead of the additional determining process, to set the image Sco that has been obtained through the last-executed scaler TV process as the intermediate correction image J, when the additional main start-setting process is executed the first time, the additional main start-setting process sets the original image I as the image Sin, and when the additional main start-setting process is executed other than the first time, the additional main start-setting process sets, as the image Sin, a corrected image Sco that has been obtained during a scaler TV process that has been executed prior to the additional main start-setting process, wherein the scaler TV process includes:

executing an additional subsidiary start-setting process to set an image Uin to be corrected through the present scaler TV process; and executing an additional correction process to correct the image Uin to a corrected image Uco by correcting the pixel value Uin(i, j) at each pixel (i, j) in the image Uin into a pixel value Uco (i, j) at the each pixel (i, j) in the corrected image Uco by performing the following calculation:

$$Uco(i,j)=Uin(i,j)+k\times\{(Num_{Uin}(i,j)/Den_{Uin}(i,j))+\alpha\times(I(i,j)-Uin(i,j))\},$$

wherein $Num_{Uin}(i,j)/Den_{Uin}(i,j)$ is pixel-value variation characteristics at the each pixel (i, j) in the image Uin, where:

$\text{Num}_{Uin}(i, j) = pXX_{Uin} \times (1+pY_{Uin}^2) - 2 \times (pX_{Uin} \cdot pY_{Uin} \cdot pXY_{Uin}) + pYY_{Uin} \times (1+pX_{Uin}^2)$, $\text{Den}_{Uin}(i, j) = (1+pX_{Uin} \cdot pY_{Uin} + pY_{Uin} \cdot pY_{Uin})$, $pX_{Uin} = [Uin(i+1, j) - Uin(i-1, j)]/2$, $pXX_{Uin} = [Uin(i+1, j) + Uin(i-1, j)] - 2 \times Uin(i, j)$, $pY_{Uin} = [Uin(i, j-1) - Uin(i, j+1)]/2$, $pYY_{Uin} = [Uin(i, j-1) + Uin(i, j+1)] - 2 \times Uin(i, j)$, $pXY_{Uin} = \{[Uin(i-1, j-1) + Uin(i+1, j+1)] - [Uin(i+1, j-1) + Uin(i-1, j+1)]\}/4$, wherein when the scaler TV process is executed for the first time, $\alpha$ has the value of zero (0), when the scaler TV process is executed other than the first time, $\alpha$ has a value that has been determined by an additional determining process that has been executed prior to the present scaler TV process;

wherein a series of the additional subsidiary start-setting process and the additional correction process is repeatedly executed as an additional subsidiary iterative loop until the series of the additional subsidiary start-setting process and the additional correction process are executed the predetermined repetition number of times; and when the additional subsidiary start-setting process and the additional correction process have been executed the predetermined repetition number of times, after executing the additional correction process, another additional final-setting process is executed to set the corrected image Uco that is obtained through the last-executed additional correction process as a corrected image Sco that is obtained through the present scaler TV process, when the additional subsidiary start-setting process is executed the first time during the present scaler TV process, the additional subsidiary start-setting process sets, as the image Uin, the image Sin that has been set during the additional main start-setting process in the present scaler TV process, when the additional subsidiary start-setting process is executed other than the first time during the present scaler TV process, the additional subsidiary start-setting process sets, as the image Uin, a corrected image Uco that has been obtained during an additional correction process that has been executed prior to the present additional subsidiary start-setting process.

8. An image de-noising method as claimed in claim 7, further comprising:
setting the threshold, the repetition number, the correction adjustment coefficient k, the parameter adjustment coefficient k', and the noise coefficient E.

9. An image de-noising apparatus, comprising:
a correcting unit that processes an original image into an intermediate correction image, the original image having a plurality of pixels that are arranged two-dimensionally, each pixel in the original image having a pixel value, the intermediate correction image having a plurality of pixels that are arranged two-dimensionally with a one-to-one correspondence with the plurality of pixels of the original image, each pixel in the intermediate correction image having a corrected pixel value;

a determining unit that determines a differential image between the original image and the intermediate correction image, the differential image having a plurality of pixels that are arranged two-dimensionally with a one-to-one correspondence with the plurality of pixels of the original image, the differential image having, for each pixel, a differential pixel value equal to a difference between the pixel value of the corresponding pixel in the original image and the corrected pixel value of the corresponding pixel in the intermediate correction image; and a determining-and-correcting unit that determines a pixel-dependent conversion parameter at each pixel based on the differential pixel value at the each pixel in the differential image and that prodesses the original image using the pixel-dependent conversion parameter, to generate a final correction image, the final correction image having a plurality of pixels that are arranged two-dimensionally with a one-to-one correspondence with the plurality of pixels of the original image.

10. An image de-noising apparatus as claimed in claim 9, wherein the determining-and-correcting unit corrects the original image into the final correction image by correcting the pixel value at each pixel in the original image based on: the pixel-dependent conversion parameter at the each pixel; and pixel-value variation characteristics at the each pixel, the pixel-value variation characteristics at the each pixel indicating variation in the pixel values at pixels surrounding the each pixel.

11. An image de-noising apparatus as claimed in claim 10, wherein the correcting unit corrects the original image into the intermediate correction image by correcting the pixel value at each pixel in the original image based on: a pixel-independent conversion parameter that is uniform for all the pixels of the original image; and the pixel-value variation characteristics at the each pixel.

12. An image de-noising apparatus as claimed in claim 11, wherein the determining-and-correcting unit includes:
an iterative-loop controller that executes a main iterative loop to correct the original image to the final correction image, the main iterative loop including a successive series of at least one main stage, the iterative-loop controller correcting a main input image into a main output image during each main stage, the successive series of at least one main stage including a first main stage that is executed first among the successive series of at least one main stage, the successive series of at least one main stage including a last main stage that is executed last among the successive series of at least one main stage, the last main stage being either the first main stage or a main stage other than the first main stage, wherein during each main stage, the iterative-loop controller executes the operations of:

(A) setting a main input image, to set the original image as the main input image during the first main stage, and to set, during a main stage other than the first main stage, a main output image resulting from a main stage prior to the subject main stage as the main input image for the subject main stage;

(B) correcting the main input image into a main output image, by correcting the pixel value at each pixel of the main input image based on a pixel-dependent conversion parameter at the each pixel, the pixel-dependent conversion parameter at the each pixel during the first main stage having a predetermined value, the pixel-dependent conversion parameter at the each pixel during the main stage other than the first main stage having a value that has been determined for the each pixel during a main stage prior to the subject main stage; and (C) judging whether or not a difference between the main input image and the main output image is greater than a first predetermined threshold, wherein during a main stage other than the last main stage, the difference becomes greater than the first predetermined threshold, wherein during the last main stage, the difference becomes smaller than or equal to the first predetermined threshold, wherein during each main stage other than the last main stage, the iterative-controller further executes the operation of:

(D) determining the pixel-dependent conversion parameter at each pixel based on:

the pixel value at the each pixel in the differential image; and a sum of weighted differences over all the pixels, the weighted difference at each pixel having a value equal to a difference that is defined between the pixel value at the each pixel of the main output image and the pixel value at the each pixel of the original image and that is weighted by the pixel-value variation characteristics at the each pixel in the main output image, wherein during the last main stage, the iterative-loop controller further executes the operation of:

(E) setting a main output image that results from the operation (B) in the last main stage as the final correction image, and stopping the main iterative loop, wherein during each main stage, the iterative-loop controller executes the operation (B) by executing a subsidiary iterative loop to correct the main input image to the main output image, the subsidiary iterative loop including a successive series of subsidiary stages, the iterative-loop controller correcting a subsidiary input image to a subsidiary output image during each subsidiary stage, the successive series of subsidiary stages including a predetermined number of subsidiary stages that includes a first subsidiary stage that is executed first among the predetermined number of subsidiary stages and a last subsidiary stage that is executed last among the predetermined number of subsidiary stages, wherein during each subsidiary stage in each main stage, the iterative-loop controller executes the operations of:

(F) setting a subsidiary input image, to set, during the first subsidiary stage, the main input image for the subject main stage as the subsidiary input image, and to set, during a subsidiary stage other than the first subsidiary stage, a subsidiary output image resulting from a subsidiary stage prior to the subject subsidiary stage as the subsidiary input image for the subject subsidiary stage; and (G) correcting the subsidiary input image into a subsidiary output image, by correcting the pixel value at each pixel of the subsidiary input image based on:

a difference that is defined between the pixel value at the each pixel of the subsidiary input image and the pixel value at the each pixel of the original image and that is weighted by the pixel-dependent conversion parameter at the each pixel that has been determined in the operation (D) during a main stage prior to the subject main stage; and the pixel-value variation characteristics at the each pixel of the subsidiary input image, wherein during the last subsidiary stage in each main stage, the iterative-loop controller further executes the operation of:

(H) setting a subsidiary output image that results from the operation (G) in the last subsidiary stage as the main output image for the subject main stage, and stopping the subsidiary iterative loop.

13. An image de-noising apparatus as claimed in claim 12, wherein the correcting unit includes:

an additional-iterative-loop controller that executes an additional main iterative loop to correct the original image to the intermediate correction image, the additional main iterative loop including a successive series of at least one additional main stage, the additional-iterative-loop controller correcting an additional main input image into an additional main output image during each additional main stage, the successive series of at least one additional main stage including a first additional main stage that is executed first among the successive series of at least one additional main stage, the successive series of at least one additional main stage including a last additional main stage that is executed last among the successive series of at least one additional main stage, the last additional main stage being either the first additional main stage or an additional main stage other than the first additional main stage, wherein during each additional main stage, the additional-iterative-loop controller executes the operations of:

(a) setting an additional main input image, to set the original image as the additional main input image during the first additional main stage, and to set, during an additional main stage other than the first additional main stage, an additional main output image resulting from an additional main stage prior to the subject additional main stage as the additional main input image for the subject additional main stage;

(b) correcting the additional main input image into an additional main output image, by correcting the pixel value at each pixel of the additional main input image based on the pixel-independent conversion parameter, the pixel-independent conversion parameter during the first additional main stage having a predetermined value, the pixel-independent conversion parameter during the additional main stage other than the first additional main stage having a value that has been determined during an additional main stage prior to the subject additional main stage; and (c) judging whether or not a difference between the additional main input image and the additional main output image is greater than a second predetermined threshold, wherein during an additional main stage other than the last additional main stage, the difference becomes greater than the second predetermined threshold, wherein during the last additional main stage, the difference becomes smaller than or equal to the second predetermined threshold, wherein during each additional main stage other than the last additional main stage, the additional-iterative-loop controller further executes the operation of:

(d) determining the pixel-independent conversion parameter based on a sum of weighted differences over all the pixels, the weighted difference at each pixel having a value equal to a difference that is defined between the pixel value at the each pixel of the additional main output image and the pixel value at the each pixel of the original image and that is weighted by the pixel-value variation characteristics at the each pixel in the additional main output image, wherein during the last additional main stage, the additional-iterative-loop controller further executes the operation of:

(e) setting an additional main output image that results from the operation (b) in the last additional main stage as the intermediate correction image, and stopping the additional main iterative loop, wherein during each additional main stage, the additional-iterative-loop controller executes the operation (b) by executing an additional subsidiary iterative loop to correct the additional main input image to the additional main output image, the additional subsidiary iterative loop including a successive series of additional subsidiary stages, the additional-iterative-loop controller correcting an additional subsidiary input image to an additional subsidiary output image during each additional subsidiary stage, the successive series of additional subsidiary stages including an another predetermined number of additional subsidiary stages that includes a first additional subsidiary stage that is executed first among the another predetermined number of additional subsidiary stages and a last additional subsidiary stage that is executed last among the another predetermined number of additional subsidiary stages, wherein during each additional subsidiary stage in each additional main stage, the additional-iterative-loop controller executes the operations of:

(f) setting an additional subsidiary input image, to set, during the first additional subsidiary stage, the additional main input image for the subject additional main stage as the additional subsidiary input image, and to set, during an additional subsidiary stage other than the first additional subsidiary stage, an additional subsidiary output image resulting from an additional subsidiary stage prior to the subject additional subsidiary stage as the additional subsidiary input image for the subject additional subsidiary stage; and (g) correcting the additional subsidiary input image into an additional subsidiary output image, by correcting the pixel value at each pixel of the additional subsidiary input image based on:

a difference that is defined between the pixel value at the each pixel of the additional subsidiary input image and the pixel value at the each pixel of the original image and that is weighted by the pixel-independent conversion parameter that has been determined in the operation (d) during an additional main stage prior to the subject additional main stage; and the pixel-value variation characteristics at the each pixel of the additional subsidiary input image, wherein during the last additional subsidiary stage in each additional main stage, the additional-iterative-loop controller further executes the operation of:

(h) setting an additional subsidiary output image that results from the operation (g) in the last additional subsidiary stage as the additional main output image for the subject additional main stage, and stopping the additional subsidiary iterative loop.

14. An image de-noising apparatus as claimed in claim 11, wherein the determining-and-correcting unit includes:

a main start-setting unit that executes a main start-setting process to set an image Fin to be corrected through a modified scaler TV process;

a modified scaler TV unit that executes a modified scaler TV process to correct the image Fin into a corrected image Fco;

a judging unit that executes a judging process to judge whether an amount of change between the image Fin and the image Fco is smaller than or equal to a threshold; and a determining unit that executes, when the amount of change between the image Fin and the image Fco is greater than the threshold, a determining process to determine a pixel-dependent conversion parameter α (i, j) at each pixel (i, j) in the corrected image Fco by calculating the following formula:

$$\alpha(i,j) = k' \times D(i,j) \times \Sigma_{i,j}\{(Num_{Fco}(i,j)/Den_{Fco}(i,j)) \times (I(i,j) - Fco(i,j))\}/E,$$

wherein D(i, j) is a pixel value at the each pixel (i, j) in the differential image D, (i, j) indicates a pixel location in an i-th column in a j-th row, where i is an integer greater than zero (0) and j is an integer greater than zero (0), the column and the row extending in predetermined directions substantially perpendicularly to each other, I(i, j) is a pixel value at the each pixel location (i, j) in the original image I, Fco(i, j) is a pixel value at the each pixel location (i, j) in the corrected image Fco, k' is a parameter adjustment coefficient, E is a noise coefficient, and $Num_{Fco}(i,j)/Den_{Fco}(i,j)$ is pixel-value variation characteristics at the each pixel location (i, j) in the image Fco, where:

$Num_{Fco}(i,j) = pXX_{Fco} \times (1+pY_{Fco}^2) - 2 \times (pX_{Fco} \cdot pY_{Fco} \cdot pXY_{Fco}) + pYY_{Fco} \times (1+pX_{Fco}^2),$ $Den_{Fco}(i,j) = (1+pX_{Fco} \cdot pY_{Fco} + pY_{Fco} \cdot pY_{Fco})^{1.5},$ $pX_{Fco} = [Fco(i+1, j) - Fco(i-1, j)]/2,$ $pXX_{Fco} = [Fco(i+1, j) + Fco(i-1, j)] - 2 \times Fco(i, j),$ $pY_{Fco} = [Fco(i, j-1) - Fco(i, j+1)]/2,$ $pYY_{Fco} = [Fco(i, j-1) + Fco(i, j+1)] - 2 \times Fco(i, j),$ $pXY_{Fco} = \{[Fco(i-1, j-1) + Fco(i+1, j+1)] - [Fco(i+1, j-1) + Fco(i-1, j+1)]\}/4;$ wherein until the judging unit determines that the amount of change between the image Fin and the image Fco is smaller than or equal to the threshold, the main start-setting unit, the modified scaler TV unit, the judging unit, and the determining unit execute a series of the main start-setting process, the modified scaler TV process, the judging process, and the determining process repeatedly as a main iterative loop, and further comprising:

a final-setting unit that executes, after the judging unit determines that the amount of change between the image Fin and the image Fco becomes smaller than or equal to the threshold, a final-setting process to set the image Fco that has been obtained through the last-executed modified scaler TV process as the final correction image O, when the main start-setting unit executes the main start-setting process the first time, the main start-setting unit sets the original image I as the image Fin, and when the main start-setting unit executes the main start-setting process other than the first time, the main start-setting unit sets, as the image Fin, a corrected image Fco that has been obtained during a modified scaler TV process that has been executed prior to the main start-setting process, wherein the modified scaler TV unit includes:

a subsidiary start-setting unit that executes a subsidiary start-setting process to set an image Vin to be corrected through the present modified scaler TV process; and a correction unit that executes a correction process to correct the image Vin to a corrected image Vco by correcting the pixel value Vin(i, j) at each pixel (i, j) in the image Vin into a pixel value Vco (i, j) at the each pixel (i, j) in the corrected image Vco by performing the following calculation:

$$Vco(i,j) = Vin(i,j) + k \times \{(Num_{Vin}(i,j)/Den_{Vin}(i,j)) + \alpha(i,j) \times (I(i,j) - Vin(i,j))\},$$

wherein k is a correction adjustment coefficient, $Num_{Vin}(i,j)/Den_{Vin}(i,j)$ is pixel-value variation characteristics at the each pixel (i, j) in the image Vin, where:

$\text{Num}_{Vin}(i, j) = pXX_{Vin} \times (1+pY_{Vin}^2) - 2 \times (pX_{Vin} \cdot pY_{Vin} \cdot pXY_{Vin}) + pYY_{Vin} \times (1+pX_{Vin}^2)$, $\text{Den}_{Vin}(i, j) = (1 + pX_{Vin} \cdot pY_{Vin} + pY_{Vin} \cdot pY_{vin})$, $pX_{vin} = [Vin(i+1, j) - Vin(i-1, j)]/2$, $pXX_{Vin} = [Vin(i+1, j) + Vin(i-1, j)] - 2 \times Vin(i, j)$, $pY_{Vin} = [Vin(i, j-1) - Vin(i, j+1)]/2$, $pYY_{Vin} = [Vin(i, j-1) + Vin(i, j+1)] - 2 \times Vin(i, j)$, $pXY_{Vin} = \{[Vin(i-1, j-1) + Vin(i+1, j+1)] - [Vin(i+1, j-1) + Vin(i-1)]\}/4$, wherein when the modified scaler TV executes the modified scaler TV process for the first time, $\alpha(i, j)$ has the value of zero (0), when the modified scaler TV executes the modified scaler TV process other than the first time, $\alpha(i, j)$ has a value that has been determined by a determining process that has been executed prior to the present modified scaler TV process;

wherein the subsidiary start-setting unit and the correction unit execute a series of the subsidiary start-setting process and the correction process repeatedly as a subsidiary iterative loop until the series of the subsidiary start-setting process and the correction process are executed a predetermined repetition number of times; and further comprising another final-setting unit that when the subsidiary start-setting unit and the correction unit have executed the subsidiary start-setting process and the correction process the predetermined repetition number of times, another final-setting process to set the corrected image Vco that is obtained through the last-executed correction process as a corrected image Fco that is obtained through the present modified scaler TV process, when the subsidiary start-setting unit executes the subsidiary start-setting process the first time during the present modified scaler TV process, the subsidiary start-setting unit sets, as the image Vin, the image Fin that has been set during the main start-setting process in the present modified scaler TV process, when the subsidiary start-setting unit executes the subsidiary start-setting process other than the first time during the present modified scaler TV process, the subsidiary start-setting unit sets, as the image Vin, a corrected image Vco that has been obtained during a correction process that has been executed prior to the present subsidiary start-setting process.

15. An image de-noising apparatus as claimed in claim 14, wherein the correcting unit includes:

an additional main start-setting unit that executing an additional main start-setting process to set an image Sin to be corrected through the scaler TV process;

a scaler TV unit that executes a scaler TV process to correct the image Sin into a corrected image Sco;

an additional judging unit that executes an additional judging process to judge whether an amount of change between the image Sin and the image Sco is smaller than or equal to the threshold; and an additional determining unit that executes, when the amount of change between the image Sin and the image Sco is greater than the threshold, an additional determining process to determine a pixel-independent conversion parameter $\alpha$ for all the pixels in the corrected image Sco by calculating the following formula:

$\alpha = k' \times \Sigma_{i,j}\{(Num_{Sco}(i,j)/Den_{Sco}(i,j)) \times (I(i,j) - Sco(i,j))\}/E$, wherein Sco(i, j) is a pixel value at the each pixel location (i, j) in the corrected image Sco, and $\text{Num}_{Sco}(i,j)/\text{Den}_{Sco}(i, j)$ is pixel-value variation characteristics at the each pixel location (i, j) in the image Sco, where:

$\text{Num}_{Sco}(i, j) = pXX_{Sco} \times (1+pY_{Sco}^2) - 2 \times (pX_{Sco} \cdot pY_{Sco} \cdot pXY_{Sco}) + pYY_{Sco} \times (1+pX_{Sco}^2)$, $\text{Den}_{Sco}(i, j) = (1 + pX_{Sco} \cdot pY_{Sco} + pY_{Sco} \cdot pY_{Sco})^{1.5}$, $pX_{Sco} = [Sco(i+1, j) - Sco(i-1, j)]/2$, $pXX_{Sco} = [Sco(i+1, j) + Sco(i-1, j)] - 2 \times Sco(i, j)$, $pY_{Sco} = [Sco(i, j-1) - Sco(i, j+1)]/2$, $pYY_{Sco} = [Sco(i, j-1) + Sco(i, j+1)] - 2 \times Sco(i, j)$, $pXY_{Sco} = \{[Sco(i-1, j-1) + Sco(i+1, j+1)] - [Sco(i+1, j-1) + Sco(i-1, j+1)]\}/4$;

wherein until the additional judging unit determines that the amount of change between the image Sin and the image Sco is smaller than or equal to the threshold, the additional main start-setting unit, the scaler TV unit, the additional judging unit, and the additional determining unit execute a series of the additional main start-setting process, the scaler TV process, the additional judging process, and the additional determining process repeatedly as an additional main iterative loop, and further comprising:

an additional final-setting process that executes after the additional judging unit determines that the amount of change between the image Sin and the image Sco becomes smaller than or equal to the threshold, an additional final-setting process to set the image Sco that has been obtained through the last-executed scaler TV process as the intermediate correction image J, when the additional main start-setting executes the additional main start-setting process the first time, the additional main start-setting unit sets the original image I as the image Sin, and when the additional main start-setting unit executes the additional main start-setting process other than the first time, the additional main start-setting unit sets, as the image Sin, a corrected image Sco that has been obtained during a scaler TV process that has been executed prior to the additional main start-setting process, wherein the scaler TV unit includes:

an additional subsidiary start-setting unit that executes an additional subsidiary start-setting process to set an image Uin to be corrected through the present scaler TV process; and an additional correction unit that executes an additional correction process to correct the image Uin to a corrected image Uco by correcting the pixel value Uin(i, j) at each pixel (i, j) in the image Uin into a pixel value Uco(i, j) at the each pixel (i, j) in the corrected image Uco by performing the following calculation:

$Uco(i, j) = Uin(i, j) + k \times \{(Num_{Uin}(i,j)/Den_{Uin}(i,j)) + \alpha \times (I(i,j) - Uin(i,j))\}$, wherein $\text{Num}_{Uin}(i, j)/\text{Den}_{Uin}(i, j)$ is pixel-value variation characteristics at the each pixel (i, j) in the image Uin, where:

$\text{Num}_{Uin}(i, j) = pXX_{Uin} \times (1+pY_{Uin}^2) - 2 \times (pX_{Uin} \cdot pY_{Uin} \cdot pXY_{Uin}) + pYY_{Uin} \times (1+pX_{Uin}^2)$, $\text{Den}_{Uin}(i, j) = (1 + pX_{Uin} \cdot pY_{Uin} + pY_{Uin} \cdot pY_{Uin})$, $pX_{Uin} = [Uin(i+1, j) - Uin(i-1, j)]/2$, $pXX_{Uin} = [Uin(i+1, j) + Uin(i-1, j)] - 2 \times Uin(i, j)$, $pY_{Uin} = [Uin(i, j-1) - Uin(i, j+1)]/2$, $pYY_{Uin} = [Uin(i, j-1) + Uin(i, j+1)] - 2 \times Uin(i, j)$, $pXY_{Uin} = \{[Uin(i-1, j-1) + Uin(i+1, j+1)] - [Uin(i+1, j-1) + Uin(i-1)]\}/4$, wherein when the scaler TV unit executes the scaler TV process for the first time, α has the value of zero (0), when the scaler TV unit executes the scaler TV process other than the first time, α has a value that has been determined by an additional determining process that has been executed prior to the present scaler TV process;

wherein the additional subsidiary start-setting unit and the additional correction unit execute a series of the additional subsidiary start-setting process and the additional correction process repeatedly as an additional subsidiary iterative loop until the series of the additional subsidiary start-setting process and the additional correction process are executed the predetermined repetition number of times; and further comprising:

another additional final-setting unit that executes, when the additional subsidiary start-setting process and the additional correction process have been executed the predetermined repetition number of times, another additional final-setting process to set the corrected image Uco that is obtained through the last-executed additional correction process process as a corrected image Sco that is obtained through the present scaler TV process, when the additional subsidiary start-setting unit executes the additional subsidiary start-setting process the first time during the present scaler TV process, the additional subsidiary start-setting unit sets, as the image Uin, the image Sin that has been set during the additional main start-setting process in the present scaler TV process, when the additional subsidiary start-setting unit executes the additional subsidiary start-setting processother than the first time during the present scaler TV process, the additional subsidiary start-setting unit sets, as the image Uin, a corrected image Uco that has been obtained during an additional correction process that has been executed prior to the present additional subsidiary start-setting process.

16. An image de-noising apparatus as claimed in claim 15, further comprising:

a threshold setting unit that enables a user to set the threshold, the repetition number, the correction adjustment coefficient k, the parameter adjustment coefficient k', and the noise coefficient E.

17. A data storage medium storing an image de-noising program having computer-executable instructions that, when executed by a computer, perform a method comprising:

processing an original image to generate an intermediate correction image, the original image having a plurality of pixels that are arranged two-dimensionally, each pixel in the original image having a pixel value, the intermediate correction image having a plurality of pixels that are arranged two-dimensionally with a one-to-one correspondence with the plurality of pixels of the original image, each pixel in the intermediate correction image having a corrected pixel value;

determining a differential image between the original image and the intermediate correction image, the differential image having a plurality of pixels that are arranged two-dimensionally with a one-to-one correspondence with the plurality of pixels of the original image, the differential image having, for each pixel, a differential pixel value equal to a difference between the pixel value of the corresponding pixel in the original image and the corrected pixel value of the corresponding pixel in the intermediate correction image; and determining a pixel-dependent conversion parameter at each pixel based on the differential pixel value at the each pixel in the differential image and processing the original image using the pixel-dependent conversion parameter to generate a final correction image, the final correction image having a plurality of pixels that are arranged two-dimensionally with a one-to-one correspondence with the plurality of pixels of the original image.

\* \* \* \* \*